US010902676B2

(12) United States Patent
    Bhuruth

(10) Patent No.: US 10,902,676 B2
(45) Date of Patent: Jan. 26, 2021

(54) SYSTEM AND METHOD OF CONTROLLING A VIRTUAL CAMERA

(71) Applicant: CANON KABUSHIKI KAISHA, Tokyo (JP)

(72) Inventor: Berty Jacques Alain Bhuruth, Bankstown (AU)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/919,720

(22) Filed: Mar. 13, 2018

(65) Prior Publication Data

US 2019/0287302 A1    Sep. 19, 2019

(51) Int. Cl.
    *G06T 19/00*    (2011.01)
    *G06F 3/0484*   (2013.01)
    *A63F 13/525*   (2014.01)
    *G06T 15/20*    (2011.01)

(52) U.S. Cl.
    CPC ........ *G06T 19/003* (2013.01); *G06F 3/04847* (2013.01); *A63F 13/525* (2014.09); *A63F 2300/6661* (2013.01); *G06T 15/20* (2013.01); *G06T 2200/24* (2013.01)

(58) Field of Classification Search
    CPC ... G06F 3/04847; G06T 15/20; G06T 19/003; A63F 13/525; A63F 2300/6661
    See application file for complete search history.

(56) References Cited

U.S. PATENT DOCUMENTS

| 5,717,869 | A | 2/1998 | Moran et al. |
| 5,977,978 | A * | 11/1999 | Carey ............... G06T 19/00 |
| | | | 345/419 |
| 8,576,235 | B1 * | 11/2013 | Sumner ............... G06T 13/20 |
| | | | 345/473 |
| 8,674,998 | B1 | 3/2014 | Schnitzer |
| 2005/0195331 | A1 * | 9/2005 | Sugano ............... H04N 5/144 |
| | | | 348/571 |

(Continued)

FOREIGN PATENT DOCUMENTS

| JP | 2005252860 A | 9/2005 |
| JP | 2015225529 A | 12/2015 |
| JP | 2017212592 A | 11/2017 |

OTHER PUBLICATIONS

TouchDraw: Freehand Path Tool Basics; Oct. 12, 2017; https://youtu.be/By6 eiigz58.

(Continued)

*Primary Examiner* — Eric J. Bycer
(74) *Attorney, Agent, or Firm* — Canon U.S.A., Inc. IP Division

(57) ABSTRACT

A system and method of controlling a virtual camera. The method comprises receiving a camera path of the virtual camera, the camera path defining movement of the virtual camera over a period of time to capture video data of a scene; and determining a plurality of control points on the camera path using a plurality of time markers within the period of time, each of the time markers corresponding to at least one event of a predetermined type being identified in the scene, wherein the control points at least partially define the camera path. The method further comprises controlling the virtual camera using the camera path modified based on the plurality of control points in response to a user input in relation to at least one of the control points.

19 Claims, 15 Drawing Sheets

(56) References Cited

U.S. PATENT DOCUMENTS

| | | | |
|---|---|---|---|
| 2008/0219509 A1* | 9/2008 | White | A63B 24/0003 |
| | | | 382/107 |
| 2012/0188231 A1* | 7/2012 | Deb | G06T 19/003 |
| | | | 345/419 |
| 2015/0120080 A1 | 4/2015 | Densham | |
| 2015/0170403 A1* | 6/2015 | Barcay | G06K 9/00476 |
| | | | 345/427 |
| 2017/0069348 A1* | 3/2017 | Ryu | G11B 27/3081 |
| 2017/0153116 A1* | 6/2017 | Huang | G06T 7/80 |
| 2017/0173468 A1* | 6/2017 | Edsall | A63F 13/5258 |

OTHER PUBLICATIONS

Thomas W. Sederberg, David L. Cardon, G. Thomas Finnigan, Nicholas S. North, Jianmin Zheng, Tom Lyche. T-spline Simplification and Local Refinement. In SIGGRAPH '04 ACM SIGGRAPH 2004 Papers, Proceedings from SIGGRAPH , Los Angeles, California, Aug. 2004; Joe Marks, Ed. ACM: New York, NY, USA, Aug. 2004; p. 276-283.

* cited by examiner

SYSTEM AND METHOD OF CONTROLLING A VIRTUAL CAMERA

TECHNICAL FIELD

The present invention relates to interpretation and modification of a camera path. In particular the present application relates to a system and method of recreating a camera path to make the camera path easier for a user to edit in context of important events in the scene.

BACKGROUND

Real time navigation of a virtual camera can be difficult. Users controlling the virtual camera are capable of moving the camera in 6 degrees of freedom while also changing zoom. The users may also be required to follow a target object in the scene. The target object is included in video data synthesized by the user controlling placement and configuration of the virtual camera from video data captured from a number of physical cameras. This target object may be a player running on a field for example. The user controlling the virtual camera may not have any knowledge about how the target object is going to move. Sometimes, the user controlling the virtual camera does not react in time causing an error in the camera path. The main priority of the person controlling the virtual camera is that they successfully capture an event from the correct camera pose. If the user feels that they didn't achieve a successful capture, then the user needs to edit the path of the virtual camera by changing the camera's pose along a timeline.

When editing a camera path presentation of the path in a user friendly manner is important. However, the original means of collecting the data (the data which is what composes the path) is typically in a form which when presented is not user friendly. For example, the path could be composed of data points representing camera coordinates recorded at a rate equal to the frame rate of the camera. In a sporting use case, the frame rate is usually 60 frames per second (fps). In a 10 second sequence, 600 points of data would form the camera path. To sustain consistent camera motion along the path the user is required to edit many points. Editing the path is a labour intensive process and does not guarantee smooth camera motion. The camera path typically comprises too much data for a user to efficiently edit.

Efficiency is an important facet in broadcasting, especially in sports broadcasting. In sports broadcasting the value of a replay of an event diminishes over time. Accordingly, it is important that a user be able to make the edits to a camera path and to produce the final output while the replay is still valuable, that is in a relatively short time frame. One known approach simplifies the path and reduces the amount of data composing the camera path. While the approach reduces the difficulty of managing a excessive amount of data, the location of the remaining data points are located almost randomly and may not be beneficial to the user.

Another advantage of efficient editing is a user being able to quickly determine which areas of the path need to be edited. The path (in original and simplified form) does not assist in this aspect as the data points would only imply camera pose coordinates.

SUMMARY

One aspect of the present disclosure provides a method of controlling a virtual camera, the method comprising: receiving a camera path of the virtual camera, the camera path defining movement of the virtual camera over a period of time to capture video data of a scene; determining a plurality of control points on the camera path using a plurality of time markers within the period of time, each of the time markers corresponding to at least one event of a predetermined type being identified in the scene, wherein the control points at least partially define the camera path; and controlling the virtual camera using the camera path modified based on the plurality of control points in response to a user input in relation to at least one of the control points.

According to another aspect, the virtual camera is controlled by enabling modification of properties of the camera path in response to the user input in relation to at least one of the plurality of control points, wherein modification of the camera path is disabled for user inputs in relation to the camera path outside of a vicinity of the control points.

According to another aspect, the camera path is recreated by interpolating a path between the plurality of control points using position in space of the virtual camera at the determined control points.

According to another aspect, modification of the camera path is enabled in a vicinity of each of the determined control points and disabled for other portions of the camera path.

According to another aspect, modification of the camera path in the vicinity of one of the control points is enabled, and in response to the modification, the camera path is modified based on further control points of the plurality of control points.

According to another aspect, the method further comprises recreating the camera path using the plurality of control points such that a geometry of the recreated camera path substantially matches a geometry of the received camera path.

According to another aspect, each of the time markers is associated with an importance score of a corresponding predetermined event, and wherein the plurality of control points is identified based on the associated importance scores.

According to another aspect, the plurality of control points is further identified based on a quality of a camera path recreated by the determined control points.

According to another aspect, the quality of the recreated camera path is determined by comparing the received camera path to the camera path recreated using the determined control points.

According to another aspect, the method further comprises reproducing at a graphical user interface a timeline of the control points with each control point being accompanied by a type of a corresponding event, the user input being received in relation to the timeline.

According to another aspect, the received camera path comprises camera speed and acceleration metadata, the camera speed and acceleration metadata being measured and collected at regular intervals along the received camera path.

According to another aspect, the camera path is recreated based on the camera speed and acceleration metadata.

According to another aspect, the camera path is recreated by interpolating camera speed and acceleration data between the determined control points.

According to another aspect, the plurality of control points are determined based on a hierarchy of events of predetermined type identified in the video data.

Another aspect of the present disclosure provides a method of controlling a virtual camera, the method comprising: receiving a camera path of the virtual camera capturing a scene, the camera path being characterised by control points corresponding to a plurality of time markers associated with at least one predetermined event type in the scene; receiving a user input to a graphical user interface reproducing a timeline of the control points, the user input being in relation to at least one of the control points; and controlling the virtual camera by modifying the camera path based on the plurality of control points in response to the user input.

According to another aspect, the timeline includes at least one annotation identifying an event associated with each of the control points.

Another aspect of the present disclosure provides a non-transitory computer readable storage medium storing program instructions for controlling a virtual camera, the program comprising: code for receiving a camera path of the virtual camera, the camera path defining movement of the virtual camera over a period of time to capture video data of a scene; code for determining a plurality of control points on the camera path using a plurality of time markers within the period of time, each of the time markers corresponding to at least one event of a predetermined type being identified in the scene, wherein the control points at least partially define the camera path; and code for controlling the virtual camera by modifying the camera path based on the plurality of control points in response to a user input in relation to at least one of the control points.

Another aspect of the present disclosure provides apparatus, comprising: a processor; and a memory device storing a software program for directing the processor to perform a method for controlling a virtual camera, the method comprising the steps of: receiving a camera path of the virtual camera, the camera path defining movement of the virtual camera over a period of time to capture video data of a scene; determining a plurality of control points on the camera path using a plurality of time markers within the period of time, each of the time markers corresponding to at least one event of a predetermined type being identified in the scene, wherein the control points at least partially define the camera path; and controlling the virtual camera by modifying the camera path based on the plurality of control points in response to a user input in relation to at least one of the control points Another aspect of the present disclosure provides a system comprising: a processor; and a memory device storing a software program for directing the processor to perform a method comprising the steps of: receiving a camera path of a virtual camera, the camera path defining movement of the virtual camera over a period of time to capture video data of a scene; determining a plurality of control points on the camera path using a plurality of time markers within the period of time, each of the time markers corresponding to at least one event of a predetermined type being identified in the scene, wherein the control points at least partially define the camera path; and controlling the virtual camera by modifying the camera path based on the plurality of control points in response to a user input in relation to at east one of the control points.

Other aspects are also described.

BRIEF DESCRIPTION OF THE DRAWINGS

One or more embodiments of the invention will now be described with reference to the following drawings; in which.

DETAILED DESCRIPTION INCLUDING BEST MODE

Figure 1:
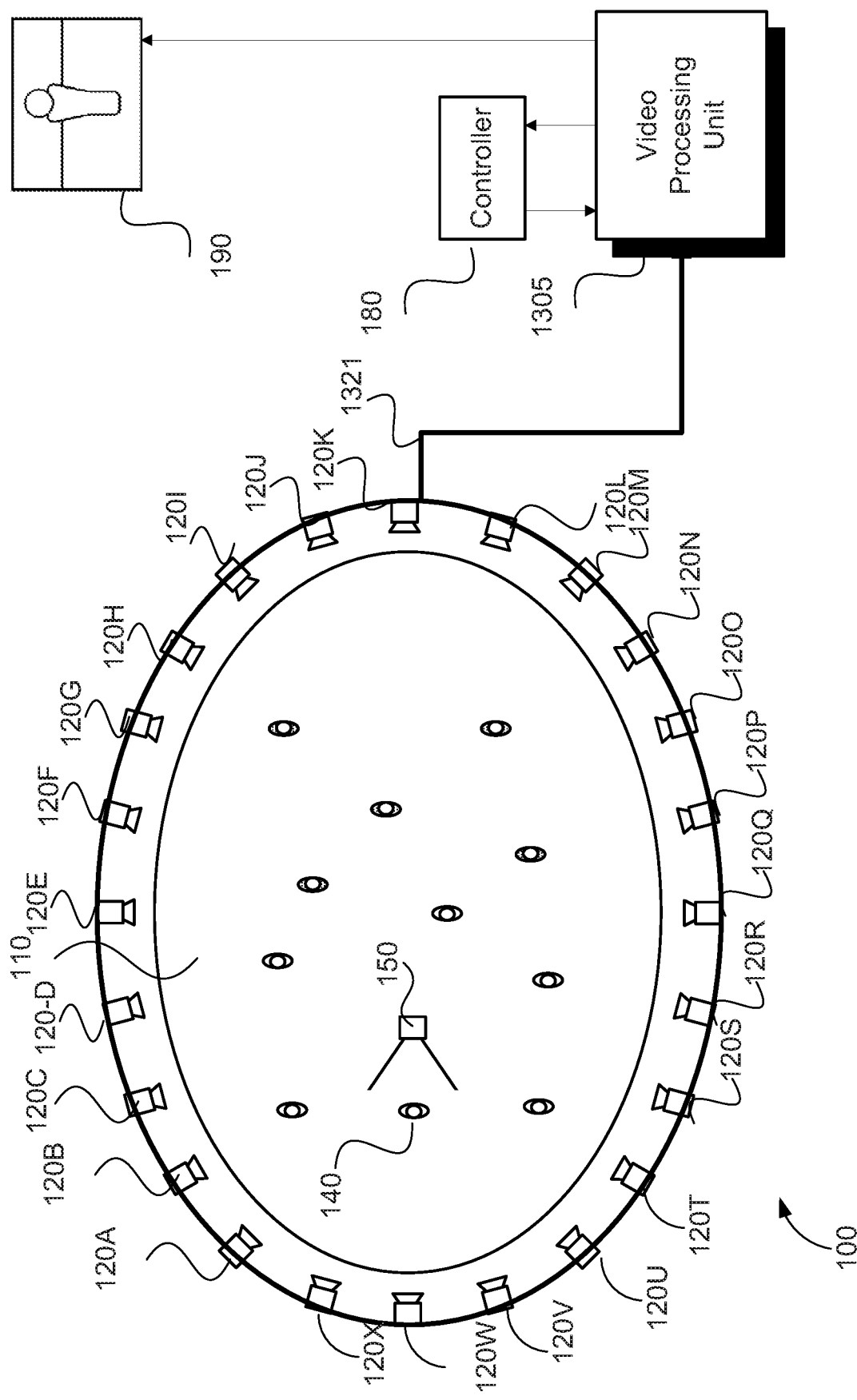
FIG. 1 shows a system of networked video cameras surrounding a sports stadium feeding data to a processing system to produce a virtual camera perspective.

Where reference is made in any one or more of the accompanying drawings to steps and/or features, which have the same reference numerals, those steps and/or features have for the purposes of this description the same function (s) or operation(s), unless the contrary intention appears.

The arrangements described relate to a method to present to a user a camera path which is efficient to edit by not only reducing the amount of the data points to edit, but also having the remaining points signify places where a user may want to edit.

The arrangements described herein are intended for use in the context of a sports or similar performance field as exemplified in FIG. 1. A scene or arena 110 is assumed to be centred on a playing field that is approximately rectangular, oval or circular, allowing the field to be surrounded by one or more rings 120 of cameras 120A to 120X. In the example of FIG. 1 the scene 110 is a field, however in other arrangements the scene could be a music stage, theatre, public or private venue. The field, in the example of FIG. 1, contains objects such as an object 140. The object 140 could be a person, a ball, a vehicle or any structure. The cameras 120A to 120X are synchronised to acquire frames at the same instants in time so that all points on the field 110 are captured simultaneously from a large number of viewpoints. In some variations, a full ring of cameras is not employed but rather some subsets of the fall perimeter are employed.

The captured video frames are subject to processing and temporary storage near the camera prior to being made available via a network connection 1321 to a computational video processing unit 1305, also referred to as a processor. The computational video processing unit 1305 receives controlling input from a controller 180 that specifies the position, orientation, zoom and possibly other simulated camera features for a virtual camera 150 within the field 110.

The role of the computational video processing unit 1305 is to synthesise a specified virtual camera perspective 190 based on the video streams available from the cameras 120A to 120X surrounding the field 110, "Virtual cameras" are referred to as virtual cameras because their functionality is computationally derived by methods such as interpolation between physical cameras or by rendering from a modelled three dimensional scene constructed using data from many cameras surrounding the scene, rather than simply the output of any single physical camera.

A virtual camera location input may be generated by a human virtual camera operator and be based on input from a user interface device such as a joystick, mouse or similar controller including dedicated controllers comprising multiple input components. Alternatively, the virtual camera position may be generated fully automatically based on analysis of game play in the field 110. Hybrid control configurations are also possible whereby some aspects of the virtual camera positioning are directed by a human operator and others by an automated algorithm. Examples of hybrid controllers include the case where coarse positioning is performed by a human operator and fine positioning, including stabilisation and path smoothing is performed by the automated algorithm.

The computational video processing unit 1305 achieves frame synthesis using one of methods for free viewpoint generation known in the art. One class of methods are model-based methods that reconstruct a full three-dimensional (3D) geometry of the scene. A second class are depth based methods that use depth estimation then generate free viewpoint video from image and depth data. A third class are image-based methods that use some kind of interpolation of image data to form the free viewpoint video directly. Techniques used to generate a 3D geometry include structure from motion, shape-from-silhouette, visual hull reconstruction, shape from focus or defocus, structure from stereo and depth/disparity estimation algorithms. The image-based rendering methods are based on sampling pixel data from a set of cameras of know geometric arrangement and combining this information, into a synthesised frame. In addition to sample based rendering of the requested frame, the computational video processing unit may also perform synthesis, 3D modelling, in-painting or interpolation of regions as required covering sampling deficiencies and creating frames of high quality visual appearance. Video streams 190 created by the computational video processing unit 1305 may subsequently be provided to the production desk (not depicted) where the video streams can be edited together to form a broadcast video.

Figure 13A:
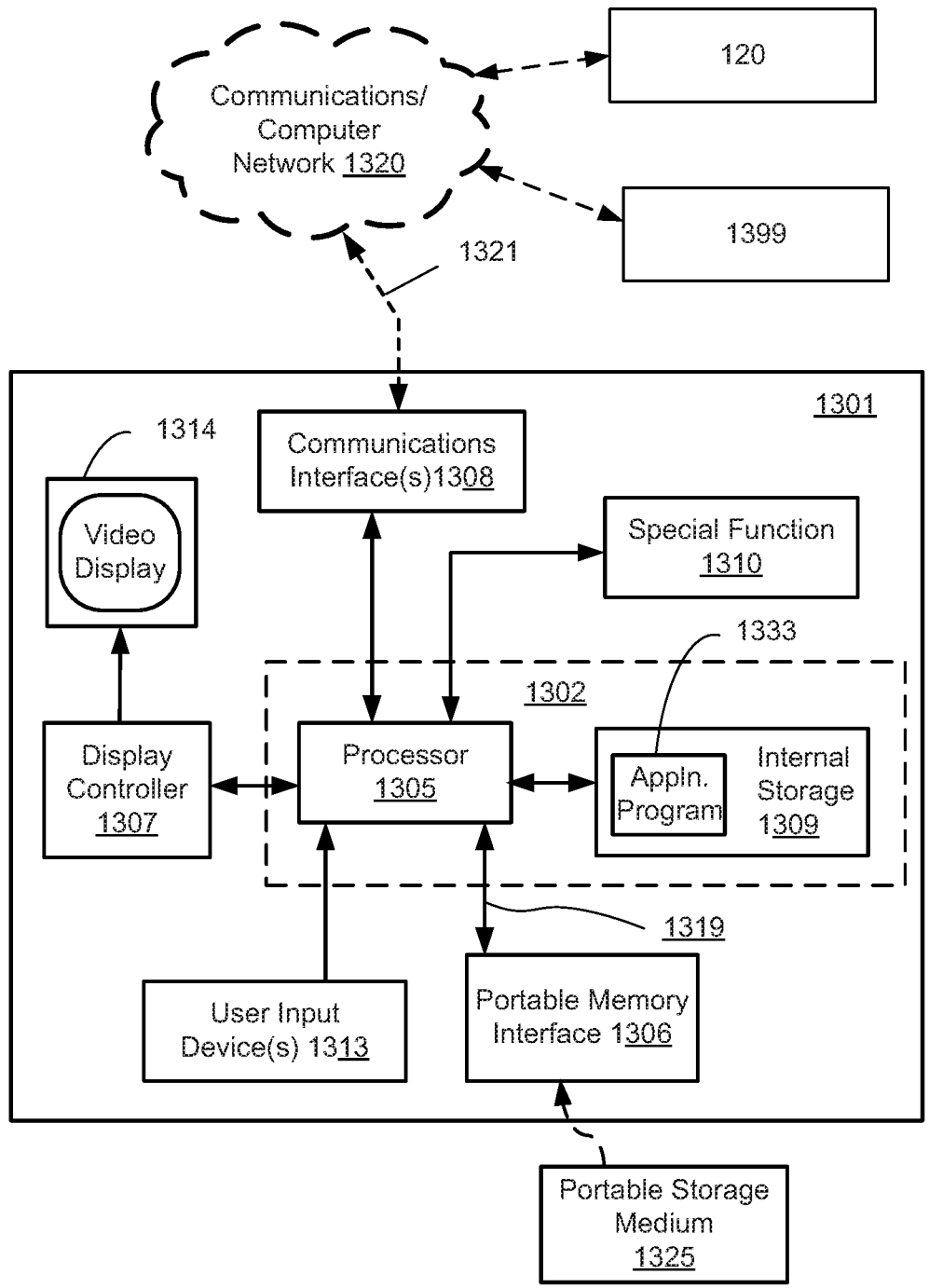
FIGS. 13A and 13B collectively form a schematic block diagram representation of an electronic device upon which described arrangements can be practised.
Figure 13B:
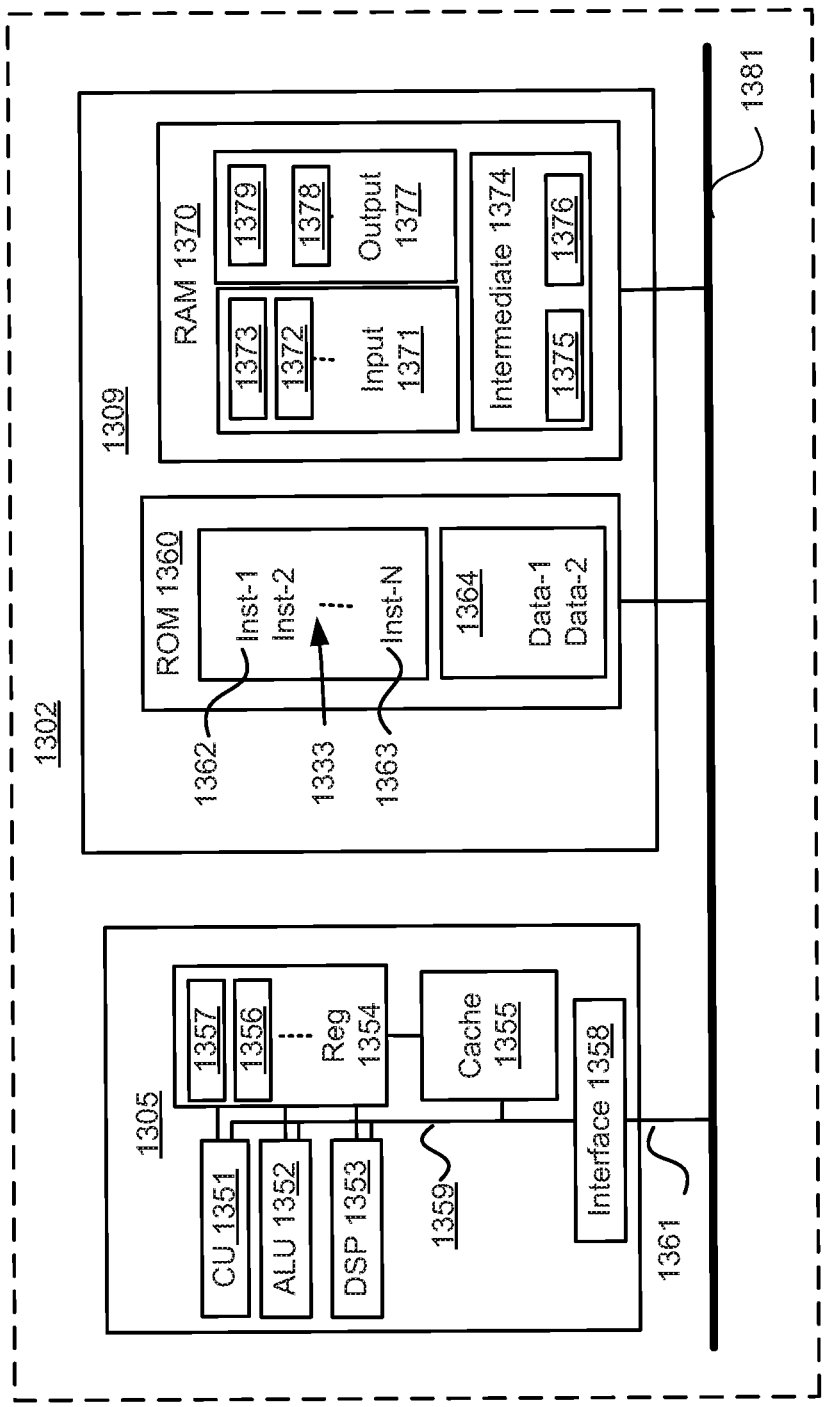

FIGS. 13A and 13B collectively form a schematic block diagram of a general purpose electronic device 1301 including embedded components, upon which the methods to be described are desirably practiced. The electronic device 1301 is preferably a device suitable for viewing and editing video footage such as a tablet. The electronic device 1301 may also be, for example, a mobile phone, a portable media player or a digital camera, in which processing resources are limited. Nevertheless, the methods to be described may also be performed on higher-level devices such as desktop computers, server computers, and other such devices with significantly larger processing resources.

As seen in FIG. 13A, the electronic device 1301 comprises an embedded controller 1302. Accordingly, the electronic device 1301 may be referred to as an "embedded device." In the present example, the controller 1302 has the processing unit (or processor) 1305 which is bi-directionally coupled to an internal storage module 1309. The storage module 1309 may be formed from non-volatile semiconductor read only memory (ROM) 1360 and semiconductor random access memory (RAM) 1370, as seen in FIG. 13B. The RAM 1370 may be volatile, non-volatile or a combination of volatile and non-volatile memory.

The electronic device 1301 includes a display controller 1307, which is connected to a video display 1314, such as a liquid crystal display (LCD) panel or the like. The display controller 1307 is configured for displaying graphical images on the video display 1314 in accordance with instructions received from the embedded controller 1302, to which the display controller 1307 is connected.

The electronic device 1301 also includes user input devices 1313 which are typically formed by keys, a keypad or like controls. In some implementations, the user input devices 1313 may include a touch sensitive panel physically associated with the display 1314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus. User input for controlling a virtual camera may be received via the input devices 1313, typically via the touch-screen 1314 if the device 1301 is a tablet computer.

As seen in FIG. 13A, the electronic device 1301 also comprises a portable memory interface 1306, which is coupled to the processor 1305 via a connection 1319. The portable memory interface 1306 allows a complementary portable memory device 1325 to be coupled to the electronic device 1301 to act as a source or destination of data or to supplement the internal storage module 1309. Examples of such interfaces permit coupling with portable memory, devices such as Universal Serial Bus (USB) memory devices, Secure Digital (SD) cards, Personal Computer Memory Card International Association (PCMIA) cards, optical disks and magnetic disks.

The electronic device 1301 also has a communications interface 1308 to permit coupling of the device 1301 to a computer or communications network 1320 via a connection 1321. The connection 1321 may be wired or wireless. For example, the connection 1321 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

The device 1301 can be connected to the network 120 of cameras via the communications network 1320. The device 1301 may also be connected to a server computer 1399 via the network 1320. The server computer operates in a similar manner to the device 1301. In some implementations, some steps of the methods described, for example the method of FIGS. 6 and 7 may be implemented on the device 1301, whereas other steps, for example some steps of FIG. 14, may be implemented at the server 1399. In some instances, the methods of FIGS. 6 and 7 may be implemented in part at the server computer 1399, as described below.

Typically, the electronic device 1301 is configured to perform some special function. The embedded controller 1302, possibly in conjunction with further special function components 1310, is provided to perform that special function. For example, where the device 1301 is a digital camera, the components 1310 may represent a lens, focus control and image sensor of the camera. The special function components 1310 is connected to the embedded controller 1302. As another example, the device 1301 may be a mobile telephone handset. In this instance, the components 1310 may represent those components required for communications in a cellular telephone environment. Where the device 1301 is a portable device, the special function components 1310 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 1302, where the processes of FIGS. 6 to 12 and 14 may be implemented as one or more software application programs 1333 executable within the embedded controller 1302. The electronic device 1301 of FIG. 13A implements the described methods. In particular, with reference to FIG. 13B, the steps of the described methods are effected by instructions in the software 1333 that are carried out within the controller 1302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1333 of the embedded controller 1302 is typically stored in the non-volatile ROM 1360 of the internal storage module 1309. The software 1333 stored in the ROM 1360 can be updated when required from a computer readable medium. The software 1333 can be loaded into and executed by the processor 1305. In some instances, the processor 1305 may execute software instructions that are located in RAM 1370. Software instructions may be loaded into the RAM 1370 by the processor 1305 initiating a copy of one or more code modules from ROM 1360 into RAM 1370. Alternatively, the software instructions of one or more code modules may be pre-installed in a non-volatile region of RAM 1370 by a manufacturer. After one or more code modules have been located in RAM 1370, the processor 1305 may execute software instructions of the one or more code modules.

The application program 1333 is typically pre-installed and stored in the ROM 1360 by a manufacturer, prior to distribution of the electronic device 1301. However, in some instances, the application programs 1333 may be supplied to the user encoded on one or more CD-ROM (not shown) and read via the portable memory interface 1306 of FIG. 13A prior to storage in the internal storage module 1309 or in the portable memory 1325. In another alternative, the software application program 1333 may be read by the processor 1305 from the network 1320, or loaded into the controller 1302 or the portable storage medium 1325 from other computer readable media. Computer readable storage media refers to any non-transitory tangible storage medium that participates in providing instructions and/or data to the controller 1302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1301. Examples of transitory or non-tangible computer readable transmission media that may also participate in the provision of software, application programs, instructions and/or data to the device 1301 include radio or infrared transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1333 and the corresponding code modules mentioned above may be executed to implement one or more graphical user interfaces (GUIs) to be rendered or otherwise represented upon the display 1314 of FIG. 13A. Through manipulation of the user input device 1313 (e.g., the keypad), a user of the device 1301 and the application programs 1333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 13B illustrates in detail the embedded controller 1302 having the processor 1305 for executing the application programs 1333 and the internal storage 1309. The internal storage 1309 comprises read only memory (ROM) 1360 and random access memory (RAM) 1370. The processor 1305 is able to execute the application programs 1333 stored in one or both of the connected memories 1360 and 1370. When the electronic device 1301 is initially powered up, a system program resident in the ROM 1360 is executed. The application program 1333 permanently stored in the ROM 1360 is sometimes referred to as "firmware". Execution of the firmware by the processor 1305 may fulfil various functions, including processor management, memory management, device management, storage management and user interface.

The processor 1305 typically includes a number of functional modules including a control unit (CU) 1351, an arithmetic logic unit (ALU) 1352, a digital signal processor (DSP) 1353 and a local or internal memory comprising a set of registers 1354 which typically contain atomic data elements 1356, 1357, along with internal buffer or cache memory 1355. One or more internal buses 1359 interconnect these functional modules. The processor 1305 typically also has one or more interfaces 1358 for communicating with external devices via system bus 1381, using a connection 1361.

The application program 1333 includes a sequence of instructions 1362 through to 1363 that may include conditional branch and loop instructions. The program 1333 may also include data, which is used in execution of the program 1333. This data may be stored as part of the instruction or in a separate location 1364 within the ROM 1360 or RAM 1370.

In general, the processor 1305 is given a set of instructions, which are executed therein. This set of instructions may be organised into blocks, which perform specific tasks or handle specific events that occur in the electronic device 1301. Typically, the application program 1333 waits for events and subsequently executes the block of code associated with that event. Events may be triggered in response to input from a user, via the user input devices 1313 of FIG.

13A, as detected by the processor 1305. Events may also be triggered in response to other sensors and interfaces in the electronic device 1301.

The execution of a set of the instructions may require numeric variables to be read and modified. Such numeric variables are stored in the RAM 1370. The disclosed method uses input variables 1371 that are stored in known locations 1372, 1373 in the memory 1370. The input variables 1371 are processed to produce output variables 1377 that are stored in known locations 1378, 1379 in the memory 1370. Intermediate variables 1374 may be stored in additional memory locations in locations 1375, 1376 of the memory 1370. Alternatively, some intermediate variables may only exist in the registers 1354 of the processor 1305.

The execution of a sequence of instructions is achieved in the processor 1305 by repeated application of a fetch-execute cycle. The control unit 1351 of the processor 1305 maintains a register called the program counter, which contains the address in ROM 1360 or RAM 1370 of the next instruction to be executed. At the start of the fetch execute cycle, the contents of the memory address indexed by the program counter is loaded into the control unit 1351. The instruction thus loaded controls the subsequent operation of the processor 1305, causing for example, data to be loaded from ROM memory 1360 into processor registers 1354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1333, and is performed by repeated execution of a fetch-execute cycle in the processor 1305 or similar programmatic operation of other independent processor blocks in the electronic device 1301

Editing of captured virtual camera footage is often required because it can be difficult for a user to correctly control the virtual camera in real time in six (6) degrees of freedom, particularly if the event the user is capturing is live, and therefore difficult to predict. Key events which occur during a span of time are typically important for the user to capture and need to be framed correctly. In applications such as a sport broadcast environment, editing a camera path needs to be done quickly, as often the value of a replay quickly degrades as more time elapses between the event and a replay. To effectively edit a camera path in an effective period of time, the user needs to identify when along the camera path the important events occur. The user then should be able to edit the path in a relatively simple and time-efficient manner.

The arrangements described relate to transforming a camera path from an original captured state into a modified state better suited for editing by a user or editor. Additionally, in this new modified state, the camera path is constructed or recreated to imply meaning and utility in guiding the user where to edit. However, it is important that the transformed camera path, in the initial transformed state capture the original intent of the original camera path.

Figure 2:
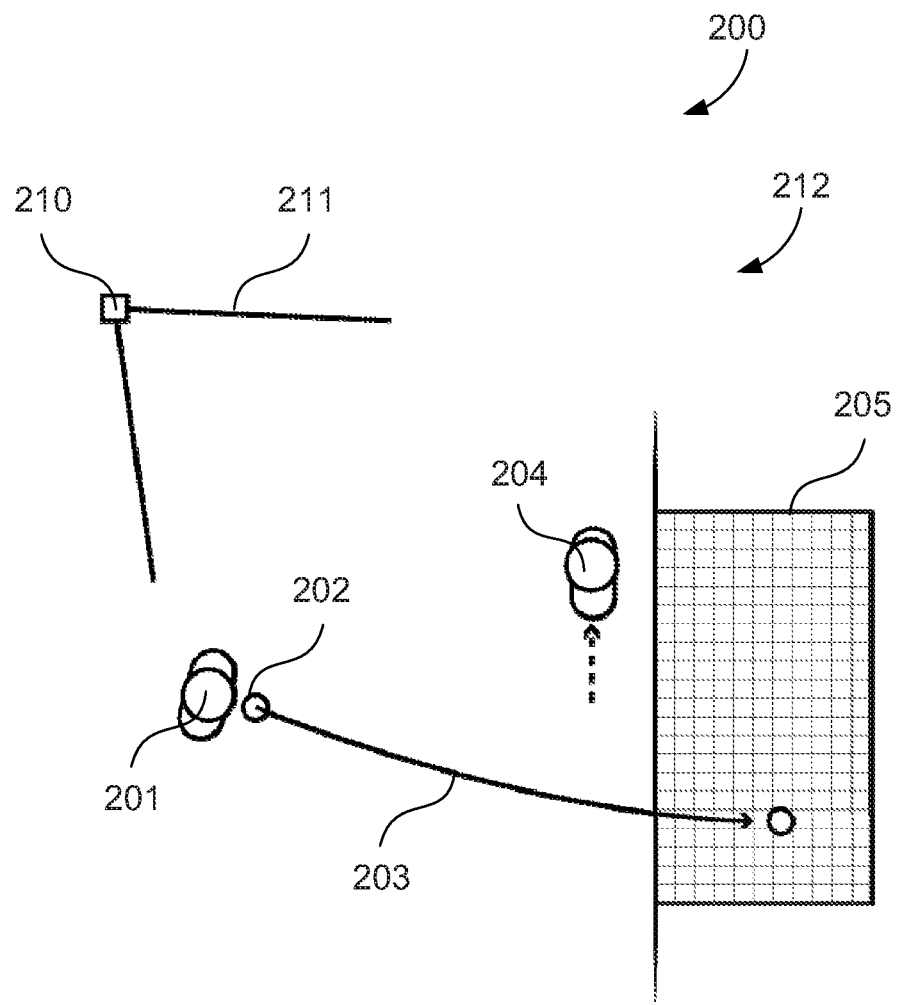
FIG. 2 shows a virtual representation of a scene and events in the scene.

To assist in explanation, FIG. 2 illustrates an example scene 200 where a virtual camera 210 with a frustum 211 is moving around a virtual environment 212. The camera 210 is capturing video of a sporting event where a player 201 kicks a ball 202 past a goalkeeper 204 into a goal net 205 along a trajectory 203. The trajectory 203 in the environment 212 is representative of a penalty kick in soccer.

Figure 3:
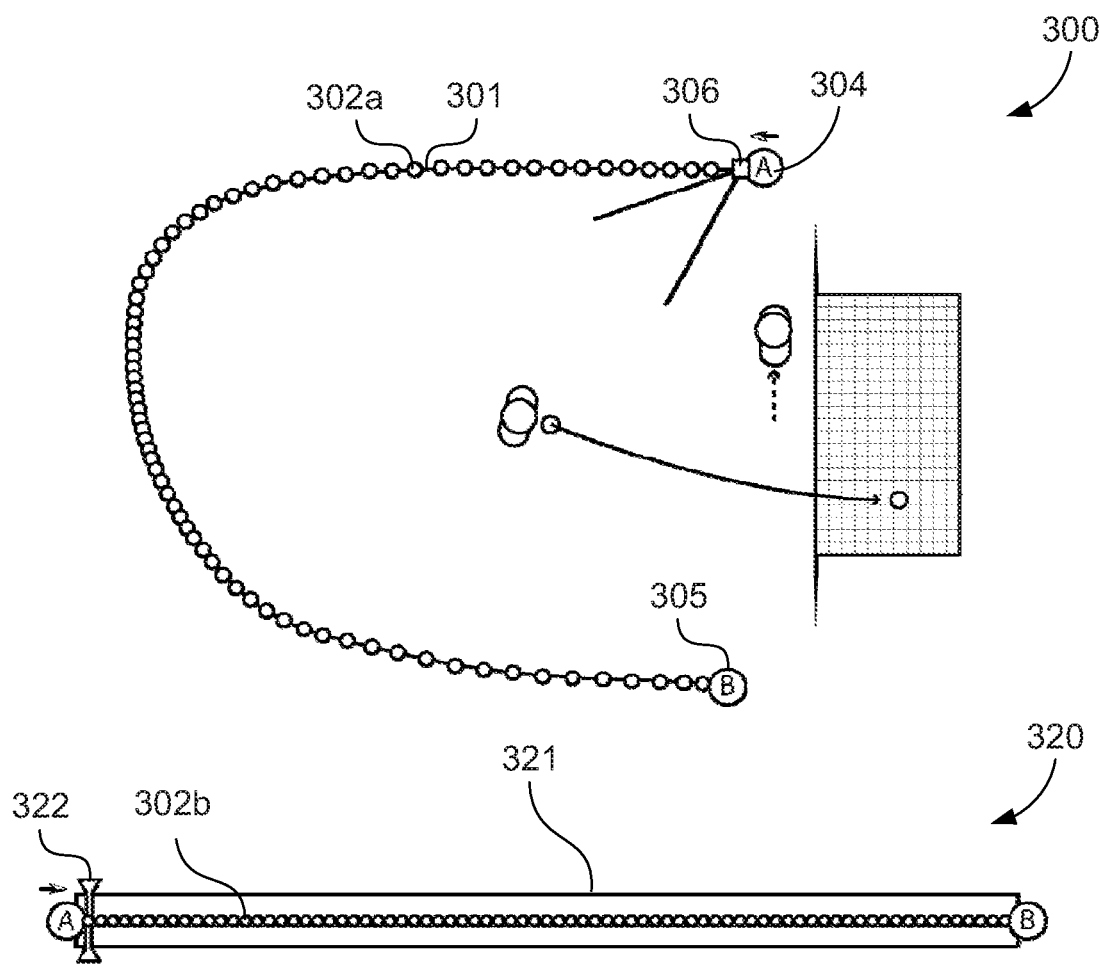
FIG. 3 shows a set comprising a virtual representation of a scene and a timeline of a graphical user interface (GUI) visualising the original camera path to a user.

FIG. 3 illustrates a virtual camera path as freely navigated in real time by a user, capturing the event outlined in the scene 200 of FIG. 2 and an associated timeline 320. A scene 300, corresponding to the scene 200, shows a top down spatial view of a path 301 of a virtual camera 306 through the virtual environment. The path 301 of the virtual camera 306 starts at a position 304 and ends at position 305. The path 301 is also visible in the virtual environment. When the virtual camera 306 is navigated in real time, the recorded data that comprises the camera path 301 is a sequence of camera pose coordinates 302a which define the pose of the camera 306 over time. The corresponding editable timeline user interface 320 displays the temporal positions of the camera pose as coordinates 302b. The timeline has a play head 322 indicating the current position of the camera 306 along the camera path 301. Depending on the frequency at which the system updates the camera's pose, e.g. 60 frames per second (fps), determines the amount of pose coordinate data. A camera path lasting 10 seconds at 60 fps would have 600 points of data. As illustrated by the timeline interface 320 if a large number of editable points are displayed on a timeline interface (one at every time increment) then the timeline will be crowded and difficult for a user to edit effectively.

Figure 4:
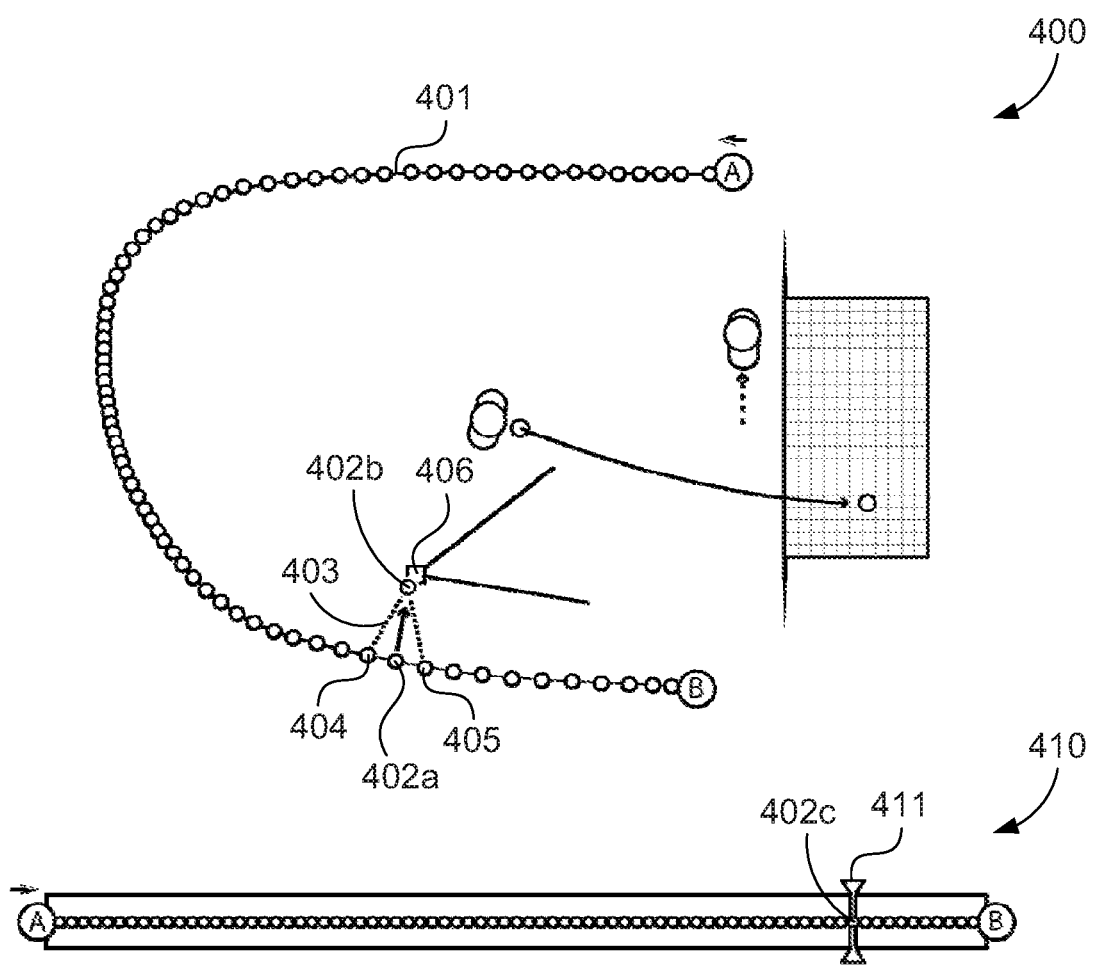
FIG. 4 shows a set of a virtual representation of a scene with an edited original camera path and a corresponding timeline.

A user is a capable of editing the camera path data. However editing a camera path in the form 320 is not ideal for an editor, as illustrated using FIG. 4. FIG. 4 shows a scene 400, corresponding to the scenes 200 and 300. The user manipulates an input of the device 1301 to move a play head 411 to a point 402c on a timeline interface 410 because the user wishes to change the position of a virtual camera 406. The user wants to change the position of the virtual camera 406 because point 402c is the moment at which the ball enters the net. The point 402c represents a moment in time and corresponds to an original pose 402a on a camera path 401. The user navigates the camera 406 from the original pose 402a to a new pose 402b. A change to the camera pose at one moment in time does not automatically move adjacent points, creating a sharp deviation 403 in the camera path 401 between the previous point 404 and the following point 405.

A simple approach to recreate the timeline 410 would be to simplify the path by reducing the amount of data using interpolation to only the pieces of data to sufficiently describe the overall path of the virtual camera, and display the pieces of data on an editable timeline interface. The simple approach is akin to a drawing application vectoring a freehand drawn line into a vector spline. The problem with the simple approach is while the approach reduces the amount of points to edit, the location of the remaining points does not facilitate easy editing at the points the user likely wants.

Figure 5:
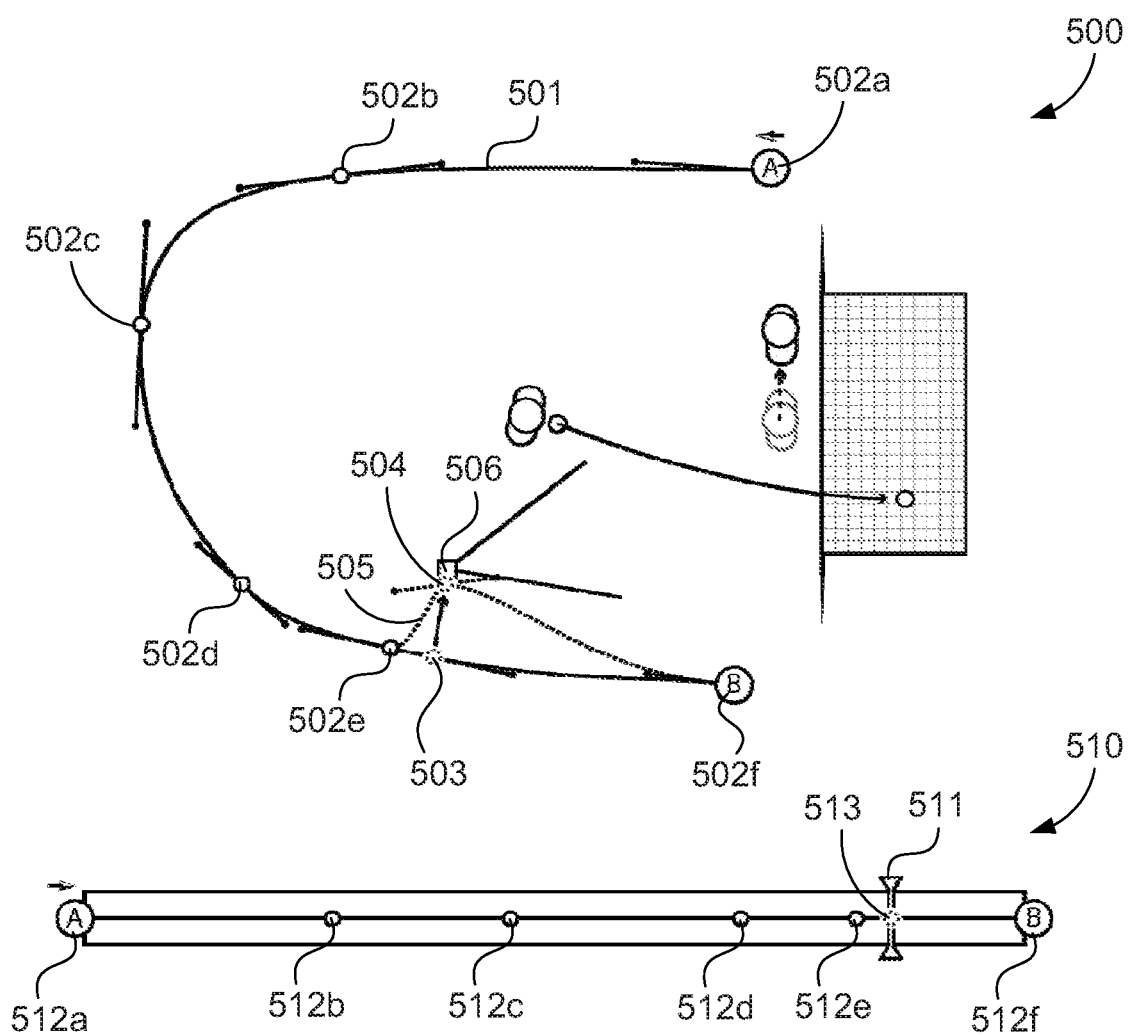
FIG. 5 shows a set of a virtual representation of a scene highlighting a limitation of an approach to simplify the original camera path and a corresponding timeline.

FIG. 5 illustrates a limitation of the simple approach. In a virtual environment 500, the original raw camera path 301 of FIG. 3 is simplified to be a path 501 with a reduced number of control points 502a-502f remaining. On a corresponding editable timeline 510, the remaining points 502a-502f are represented as points 512a-512f respectively. The user moves the play head 511 to the position on the timeline 510 to modify the camera path at the moment of the ball entering the net. To modify the path, the user is required to create a new editable point (appearing both on the timeline 513 and on the camera path 503 in the virtual environment 500). The user modifies the path by moving the new point 503 from an original position to a new position 504. The effect of the change causes a new deviation from the path 505. The shape of the path deviation 505 is based on a smooth interpolation from the existing point 502*e*, to the modified position of the new point 504, and then to the next already existing point 502*f*. As a result the camera 506 has to suddenly increase speed to travel further over a shorter amount of time between points 502*e* and 504. The sudden speed change in combination with the difference in position makes the resulting camera path unpleasant to view. To correct this, the user will need to edit point 502*e*; and in some instances also point 502*d*, if the intent is form a smooth arcing path from start to finish.

In the example described herein, a user whose role is to record free viewpoint replays of a sporting event is referred to as a camera operator. The example event described is of a player kicking a football past a goalkeeper, into the goal, as depicted in the examples of FIG. 3, FIG. 4, and FIG. 5. The camera operator uses the control of the controller 180 to manually control the virtual camera around a virtual environment to record a replay captured from the point of view of the virtual camera. Upon reviewing the footage captured by the virtual camera using the device 1301, the camera operator wishes to edit the original recorded camera path to make improvements to better capture the significant moment.

Figure 6:
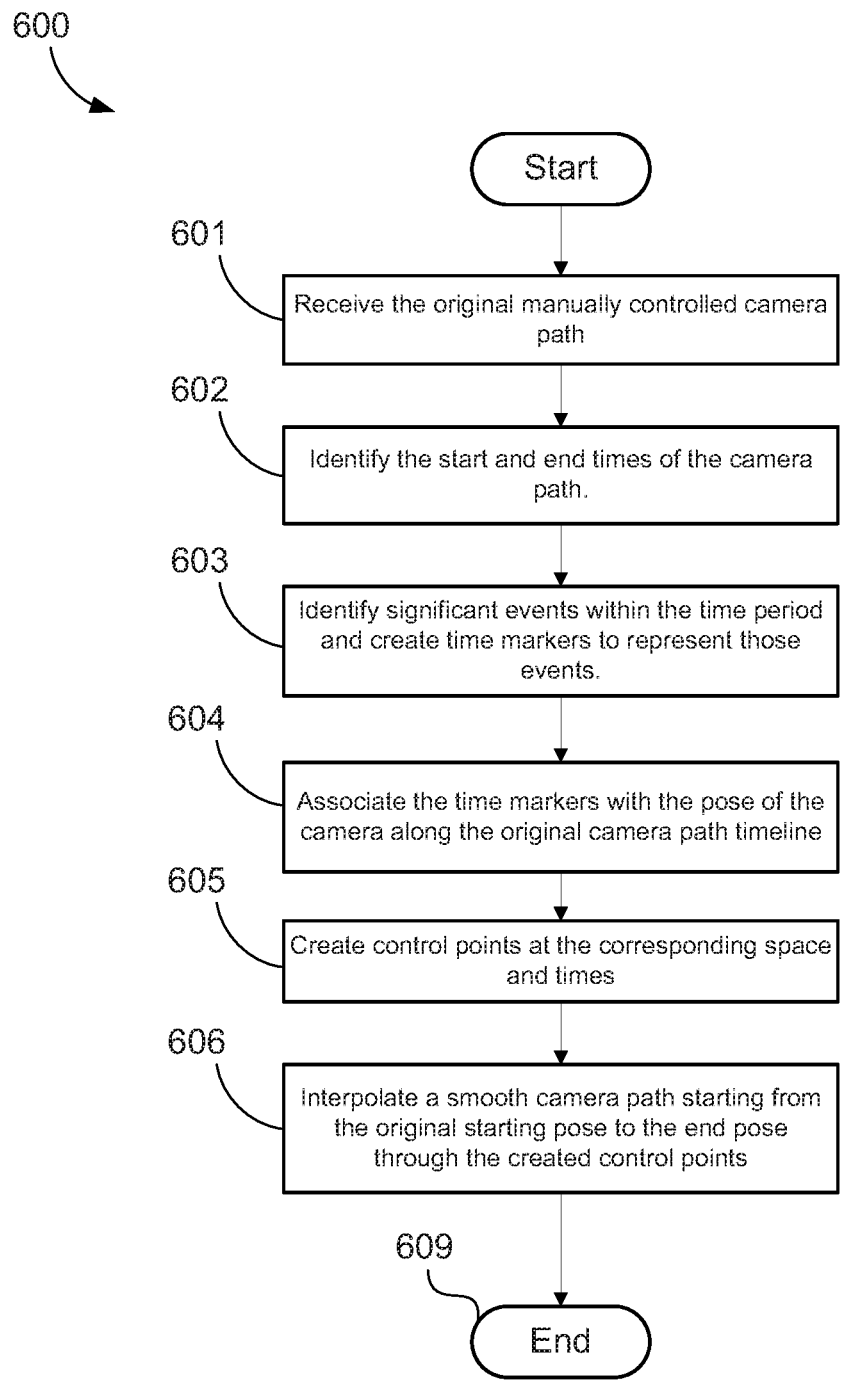
FIG. 6 shows a flowchart of a method of recreating a virtual camera path.

FIG. 6 shows a method 600 of modifying a camera path for increased ease of user editing. The method 600 is typically implemented as one or more modules of the application 1333, stored in the memory 1309 and controlled under execution of the processor 1305.

The method 600 starts as a result of the camera operator pressing an edit button, or entering an edit mode of the application 1333. The method 600 is used to prepare and present the camera path in a format which is easy for a camera operator to edit.

The method 600 starts at a receiving step 601. At step 601, the application 1333 receives the original manually controlled camera path. For example, the manually controlled camera path is stored on one of the cameras 120A to 120X and transmitted to the device 1301. In some arrangements the manually controlled camera path and the video data captured by the cameras 120A to 120X are transmitted to the server computer 1399.

The method 600 continues under execution of the processor 1305 from step 601 to an identifying step 602. In step 602, the application 1333 identifies the start and end times of the received camera path. For example, the start time of the camera path typically coincides with the beginning of the recording, and the end time coinciding with the end of the recording. The start and end times are recorded as timecodes from the timeline of the virtual environment.

Knowing the start and end times the application 1333 determines the period of time in which the camera path existed in the virtual environment.

The method 600 continues under execution of the processor 1305 from step 602 to an identifying step 603. At step 603, the application 1333 identifies significant events within the time period of the camera path, and then creates time markers to represent the significant events. The time marker holds a time value, e.g., a timecode, and signifies that an event occurred in the scene at that time. In some arrangements, the time marker may hold or include a type of the identified significant event corresponding to the time marker, for example a type relating to a goal, penalty, passing/kicking a ball or the like. Step 603 operates to identify events that are considered significant based upon predetermined indication of what is considered significant, but does not distinguish between levels of significance or importance.

In some implementations, step 603 operates to transmit a query from the tablet device 1301 to the server computer 1399 regarding significant events. The server computer 1399 operates to identify the significant events, for example by analysis video data received from the camera network 120, or using sensors attached to the objects 140 (for example players or a ball). The server 1399 returns identification of the significant events to the tablet device 1301.

The method 600 continues under execution of the processor 1305 from step 603 to an associating step 604. At step 604, the application 1333 associates the time markers of the identified events with the poses of the camera along the original camera path timeline. The application 1333 stores sets of values (corresponding to each time marker) describing the camera's poses along the original camera path. In the arrangements described, a camera pose is defined as a camera's position, orientation and zoom characteristics. Each of the time markers corresponds to at least one event of a predetermined type that was identified in step 603.

The method 600 continues under execution of the processor 1305 from step 604 to a creating step 605. At step 605, the application 1333 creates new control points at the associated space and times based on the sets of pose values stored by the application 1333 at step 604. A set of pose values stored by the system defines the spatial coordinates of the new point while the time marker is used to define when in the timeline to create the new control point. Each newly created control point is represented both in the virtual environment at the prescribed spatial coordinate, and on the timeline interface at the prescribed timecode. The step 605 effectively operates to determine a plurality of control points on the camera path using the plurality of time markers within the period of time between the start and end times of the virtual camera video capture. The control points at least partially define the original camera path.

The method 600 continues under execution of the processor 1305 from step 605 to an interpolating step 606. At step 606, the application 1333 interpolates a smooth modified camera path starting from the original starting camera pose to the original end camera pose, through the control points created in step 605. Step 606 operates to interpolate properties such as geometry (position in space), acceleration and speed of transitions of the virtual camera at the control points. Geometry or position of the virtual camera relates to pose the virtual camera. As described above, the pose relates to orientation, location and other characteristics of the virtual camera. The step 606 can include generation of a timeline associated with the recreated camera path, for example including markers of the timeline 510 of FIG. 5 along with a type of the corresponding significant event identified at 603 and associated with each of the markers (not shown). Upon generation, the timeline having time markers annotated using corresponding events is reproduced using a GUI interface for editing by a user. The user can use input of the device 1301, such as the touch-screen 1314, to edit the recreated camera path. Following execution of step 606, the method 600 ends at 609. In some arrangements, the timeline can be generated at step 605 rather than step 606.

Figure 7:
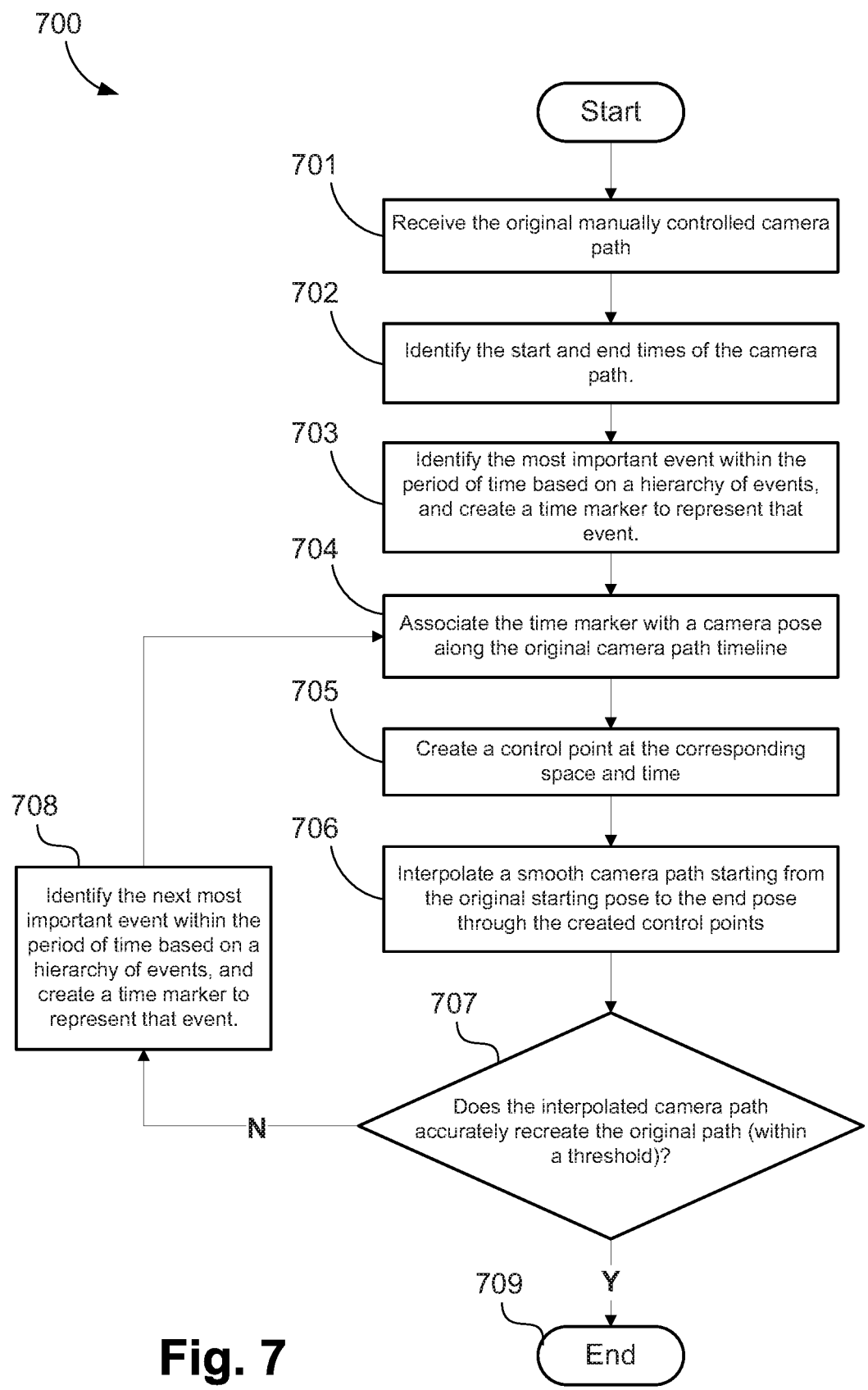
FIG. 7 shows a flowchart of a method of recreating a complex virtual camera path where there are insufficient time markers to sufficiently describe the scene.

In cases when the overall curve order of the camera path is low, for example if the camera path can be defined by a line or a quadratic curve, or when the order of the curve is lower than the number of identified significant events, the method 600 is typically sufficient to recreate a camera path that replicates the intention of the original path and the user who controlled capture of the original camera path. If the original camera path is complex, meaning the path has multiple sections of considerable curvature, an alternative method can be used. A complex camera path can for example be defined by a higher-order curve such that the order of the curve exceeds the number of the identified events. Resultantly, the camera path recreated by the method 600 can include insufficient time markers at the regions where the path requires a control point. The alternative method is described in relation to FIG. 7, FIG. 7 shows a method 700 of recreating an easy to edit camera path when there are insufficient time markers to properly define the curvature of the original camera path. The method 700 is typically implemented as one or more modules of the application 1333, stored in the memory 1309 and executed under control of the processor 1305.

The method 700 starts as a result of the camera operator pressing an edit button, or entering an edit mode.

The method 700 starts at a receiving step 701. At step 701, the application 1333 receives the original manually controlled camera path. In the example of FIG. 7, the received path is the same as the original path 301 of FIG. 3.

The method 700 continues under execution of the processor 1333 from step 701 to an identifying step 702. In step 702, the application 1333 identifies the start and end times of the camera path. In the example described, the start time of the camera path equals with the beginning of the recording, and the end time equals with the end of the recording. The start and end times are recorded as timecodes from the timeline of the virtual environment. Knowing the start and end times the application 1333 calculates the period of time in which the camera path existed in the virtual environment.

The method 700 continues under execution of the processor 1333 from step 702 to an identifying step 703. At step 703, the application 1333 identifies a most important event within the period of time based on a hierarchy of events. An event can be identified in a similar manner to step 603. However, step 703 operates to further identify an importance level of the event using a hierarchy. There are multiple methods which the application 1333 could employ to identify important events. One method is to utilise object tracking to follow the movements of all objects in the virtual environment and detect how the tracked objects interact with one another other. Examples of objects that could be tracked include but are not limited to, people (and their parts), equipment (such as balls), vehicles, and a physical camera. The manner in which the tracked objects interact can be used to recognise events. Examples of such objects and interactions include, the ball making contact with a net, a player making contact with another player, a player making contact with the ball, and the ball moving from one space to another, e.g. into a goal area, or outside the field of play. Another method to detect an event is an operator of the cameras 102A to 120X marking when important events occurred and the type of event, for example using the controller 180, or an input of the tablet device 1301. Another method that could be used to identify events is to measure the sound level of the crowd's reaction to detect and event and to gauge a significance based on the sound level.

In some implementations, step 703 operates to transmit a query from the tablet device 1301 to the server computer 1399 regarding significant events. The server computer 1399 operates to identify the significant events and a level of importance of each event using the hierarchy. The server 1399 returns identification of the events and the associated level of importance to the tablet device 1301.

Figure 8:
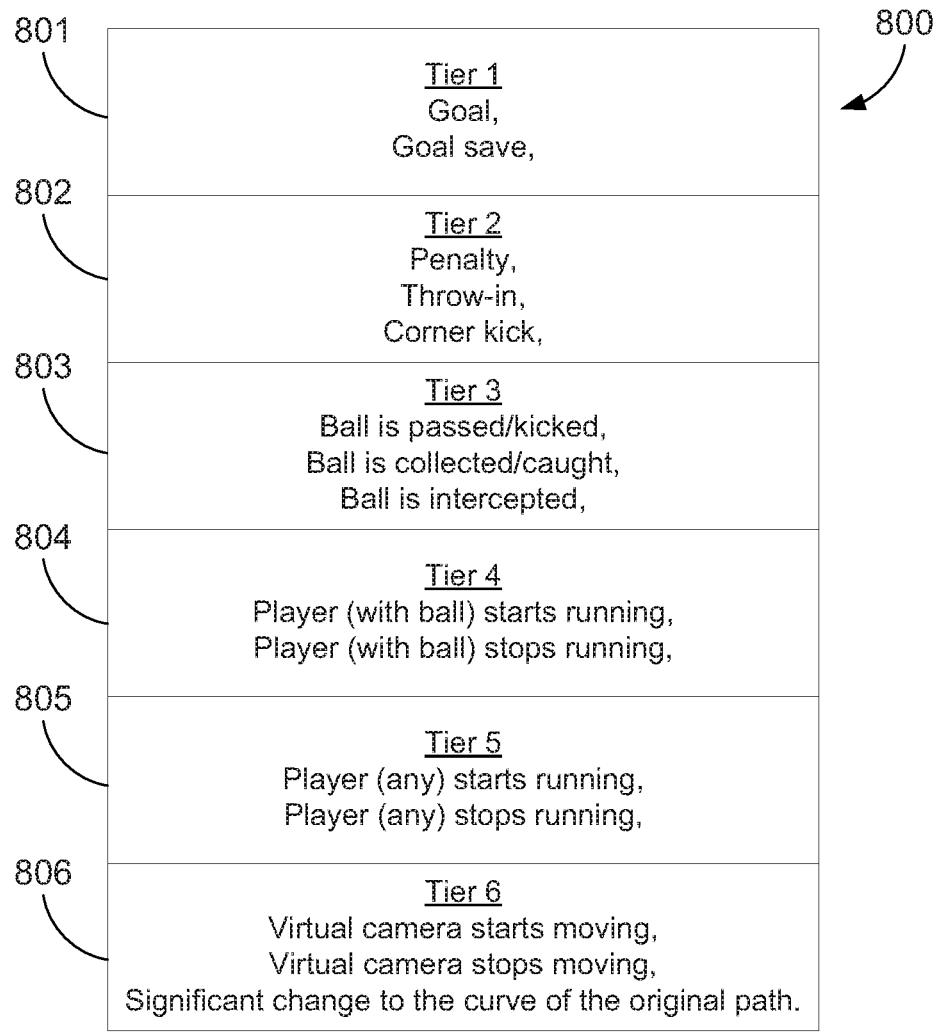
FIG. 8 shows an example of a hierarchy of events.

Once an event is recognised and classified at step 703 the event is compared to a hierarchy of valid events ranking the event from very significant to least significant. The hierarchy and the event classification are pre-defined. FIG. 8 below describes in detail an example hierarchy of events. Once the application 1333 identifies the most important event, the method 700 moves from step 703 to an associating step 704.

At step 704, the time marker of the identified event is used to associate the event with a camera pose along the original camera path. The application 1333 stores a set of values describing the camera's pose. In the context of the present disclosure, camera pose is defined as the camera's position, orientation and zoom characteristics.

The method 700 continues under execution of the processor 1333 from step 704 to a creating step 705. At step 705, the application 1333 creates a new control point at the corresponding space and time. The 6 dimensional values held by the system define the spatial coordinates of the new point while the timecode of the identified event is used to define the when in the timeline to create the control point. This newly created control point is represented both in the virtual environment at the prescribed spatial coordinate, and on the timeline interface at the prescribed timecode. The control point is created or determined in a similar manner to step 605. As the control points are determined based upon the importance score or hierarchy of the event determined at step 703, the control points are effectively identified based on the associated importance scores.

The method 700 continues under execution of the processor 1333 from step 705 to an interpolating step 706. At step 706, the application 1333 interpolates a smooth camera path starting from the original starting camera pose to the original end camera pose, through the control points created in step 705. The step 706 operates in a similar manner to step 606.

The method 700 continues under execution of the processor 1333 from step 706 to a check step 707. At step 707, the application evaluates the newly interpolated camera path created as part of step 706 to determine if the interpolated camera path accurately recreates the original path within a threshold. Step 707 uses the control points of step 705 to determine if a geometry of the recreated camera path substantially matches a geometry of the camera path received at step 701 by comparing the recreated and received camera paths. The application 1333 performs the evaluation by calculating the difference between the original camera pose and the new camera pose of the new camera path for each increment of time of the camera paths, and summing the differences together. If the calculation generates a value smaller than a pre-defined threshold ("Y" at step 707) the method 700 ends at 709 as the positive finding means the generated camera path sufficiently replicates the trajectory of the original camera along the original path, while having the minimum amount of control points, and having the temporal position of the control points on the timeline represent event's of high importance in the scene. Determining whether the difference is smaller than a pre-defined threshold represents a quality of camera path recreated using the determined control points at step 706. The step 707 in this event can include generation of a timeline associated with the recreated camera path and reproduction of the timeline using a GUI interface for editing by a user. The threshold for which constitutes a sufficiently replicated camera path is a value pre-set by a user in an options menu.

If the calculation generates a value larger the pre-defined threshold ("N" at step 707), then the method 700 moves from step 707 to an identifying step 708, as the generated path does not sufficiently replicate the original path and requires more control points to increase the resolution of the camera path.

At step 708, the application 1332 returns to the generated hierarchy of events 800 and identifies the next most important event within the period of the time of the camera path. Once the next most important event is identified, the method 700 returns to step 704 to correspond the event with a camera pose along the original camera path.

The method 700 operates to recreate the original virtual camera path in simplified form based on significant events identified using techniques described above. The method 700 operates to recreate the virtual camera path in a manner that decreases data storage and increases a user's ability to edit and control the virtual camera to capture an important replay. Reducing the number of control point firstly decreases the data associated with the camera path. Further, by selecting control point based on identified events (both method 600 and 700) the user's ability to quickly identify and edit a salient event is improved. The methods 600 and 700 allow the original intention of the camera path to be maintained, in particular for complex curves using steps 704 to 708 of FIG. 7. The control points are effectively identified based on a quality of a camera path recreated by operation of steps 704 to 708. The loop of steps 704 to 708 allow the received virtual camera path to be recreated using the control points and importance scores (hierarchy) associated with the identified events.

Each of steps 605 and 705 (or steps 606 and 706) can involve generation and display of a corresponding timeline interface, as described in relation to FIG. 9 below.

FIG. 8 illustrates an example hierarchy of events 800. In the example of FIG. 8, the hierarchy of events 800 pertains to a soccer/football scenario. Different hierarchies would exist for different event scenarios, e.g. running race scenario (along with other Olympic athletic sport scenarios), car racing scenario, a concert scenario, and the like.

The hierarchy 800 is illustrated from the most important to the least important, with the most important at the top, and the least important at the bottom. The hierarchy 800 has 6 tiers of importance 801-806 shown in descending order. The tiers of the hierarchy effectively represent an importance score of the identified event associated with each time marker. In the example of FIG. 8 a low score or tier indicates higher importance. In other arrangements the hierarchy may represent importance in ascending order. Tier 1 801, the top tier, is reserved for goal and goal save events. Tier 2 802, categorizes penalty, throw-in, and corner kick events. Tier 3 803, categorizes events when the ball is passed or kicked, the ball is collected by a player, or a ball is intercepted by an opposing player. Tier 4 804, categorizes events when the player (with the ball) starts running, and when the player (with the ball) stops running. Tier 5 805, categorizes events when the player (any player) starts running, and when the player (any player) stops running. Tier 6 806, categorizes events of when the virtual camera starts moving, when the virtual camera stops moving, and if the curve of the original path significantly changes (changes determined by comparing a derivative in x, y, z, orientation against a predetermined threshold). The contents of tier 6 806 would be common to all hierarchies and would sit in each hierarchy's lowest tier. Although not shown in the hierarchy 800, but each event in each tier can form a sub-hierarchy. For example, in tier 1 801, a goal event can be higher in importance than a goal save event.

What constitutes a hierarchy will vary from sport to sport and event to event. The hierarchy in each use case depends on variables such as the number of players/participants, salient actions or interactions and in some cases can be subjective and be based on preferences of an administrator, visual effects artists, broadcasters, or users of the network 120 of cameras. An example of a different hierarchy is for a figure skating performance. The events which comprise a figure skating performance are different from a soccer/football event and would require a user to preconfigure a hierarchy to suit the event. Preconfiguring a suitable hierarchy may require incorporating additional sensors, and inputs to provide the server with the correct data to recognise different events, e.g. gyroscopes, accelerometers, worn positional trackers, audio input, etc.

A user configuring a hierarchy for a figure skating event may define the hierarchy in this way. Tier 1 which would hold the most significant events, could comprise events where the performer performs a manoeuvre where they leap from off the ice and travel through the air. Tier 2 could hold events where the performer performs a spinning manoeuvre on the ice. Tier 3 could hold events where the performer reverses direction. Tier 4 could hold events which relate to the musical changes in the accompanying music. Tier 5 could hold events representing the moments where the performer starts and stops skating. And as stated above, tier 6 holds events of when the virtual camera starts moving, when the virtual camera stops moving, and if the curve of the original path significantly changes.

In both of the examples provided, the soccer/football & the figure skating hierarchies, the hierarchies contain 6 tiers with the $6^{th}$ tier holding events related to the camera path. Hierarchies can have more or less tiers and camera related events do not need to be in the $6^{th}$ tier.

Another event example, one which is non-competitive is a theatre play. In addition to the sensors and inputs described above, an event like a play may require different inputs for the recognition of event unique to the medium, e.g. the plays script could be fed to the system and speech recognition could be used to trigger events based on sections of the script.

A user configuring a hierarchy for a theatre event may define the hierarchy in this way. Tier 1 could comprise important events in the plays story, for example parts of the story which may have been deemed important by the playwright. Tier 2 could hold events where actors' movement and position correlate to stage directions described in the script. Tier 3 could hold musical cues such as the start and ending of musical sequences. Tier 4 could hold events of when the virtual camera starts moving, when the virtual camera stops moving, and if the curve of the original path significantly changes.

Figure 9:
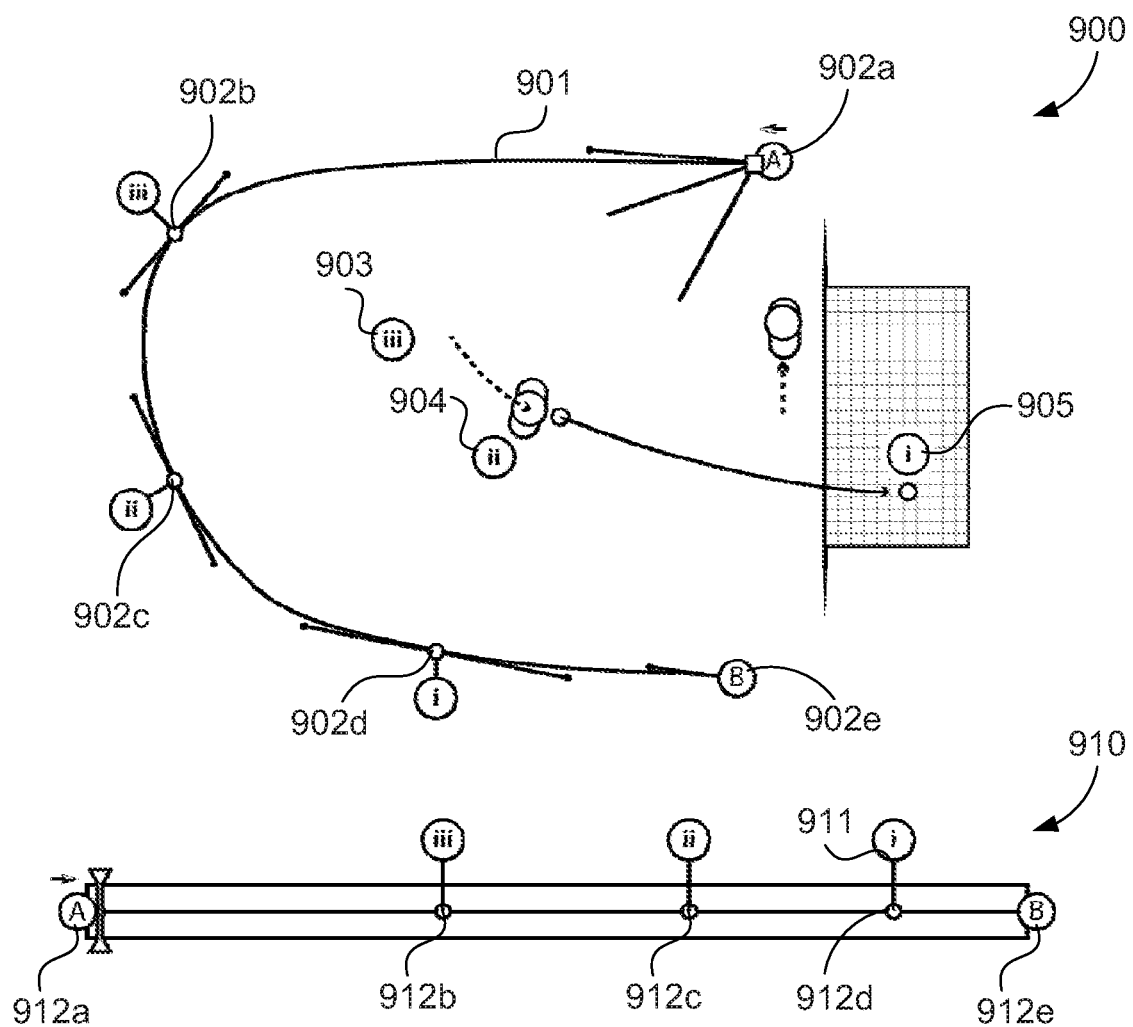
FIG. 9 shows an illustration of a virtual representation of a scene with a camera path recreated using the method of FIG. 6 or FIG. 7.

FIG. 9 shows an illustration of a recreated camera path after the original camera path 300 has been modified using the method 700. In a virtual environment 900, the original raw camera path 301 is simplified to be a recreated path 901. The path 901 has a reduced number of edit (control) points remaining, shown as control points 902a-902e. On a corresponding editable timeline 910, generated at step 707, the points 902a-902e are represented as points 912a-912e respectively. The remaining points 902a-902e and 912a-912e are created in execution of step 705 and to reflect events 903, 904, and 905. The section of the camera path which corresponds with the event of a ball entering the net 905 is the most important event as the section is identified as relating to a goal event thus relates to a tier 1 801 event. The identification of the goal event 905 results in the application 1333 creating the time marker 912d signifying the event, and causes the creation of the control point 902d.

The creation of the location of the control point 902*d* is based on where the virtual camera was situated at the time corresponding to the time marker of the event. However the creation of the control point 902*d* in combination with the start pose control point 902*a* and the ending pose control point 902*e* will not recreate the original path 301. For example, path curvature, that is the order of the curve defining the camera path, could be compound to require additional points to accurately reproduce the original intent of the original camera path.

Following step 708, the method 700 returns to identify the next most important event. The next most important event relates to tier 3 803 of t 800 and is when the player (in the example of FIGS. 3 and 9 a goal kicker) kicks the ball at 904. The kick event creates the control point 902*c* in the environment 900 and the corresponding point 912*c* on the timeline 910. The new control point 902*c* still does not sufficiently define the original camera path (300), so the method 700 repeats steps 704 to 707 identifying the player (goal kicker) beginning to run at the point 903 as the next important event. Execution of the steps 704 to 705 for the event creates the control point 902*b* and the corresponding timeline event 912*b*. Using the control points 902*b*-902*d*, as well the start and end points 902*a* and 902*e*, the interpolated path 90 lean be constructed at step 706 the is determined to sufficiently recreate the original path 301 at step 707. In the arrangements described, execution of step 707 also operates to generate and reproduce the timeline 910 on the display 1317 for the user's reference.

One method to determine whether the interpolated path sufficiently recreates the original path at step 707 is to, first, for each time increment calculate the distance between the corresponding points on the original path an interpolated path, and subsequently sum the totals. If the total sum is less than a pre-determined threshold, the interpolated path is deemed sufficient. At the completion of creating a sufficient camera path, the user is enabled to edit the camera path by modifying the one or more of control points created and disabled from editing outside the vicinity of the control points, for example by storing the control points 902*a* to 902*e* and for editing. A user can choose to edit outside the vicinity of the existing control points by using a user interface (such as a user interface typically used for editing a camera path) to create additional control points.

Figure 10:
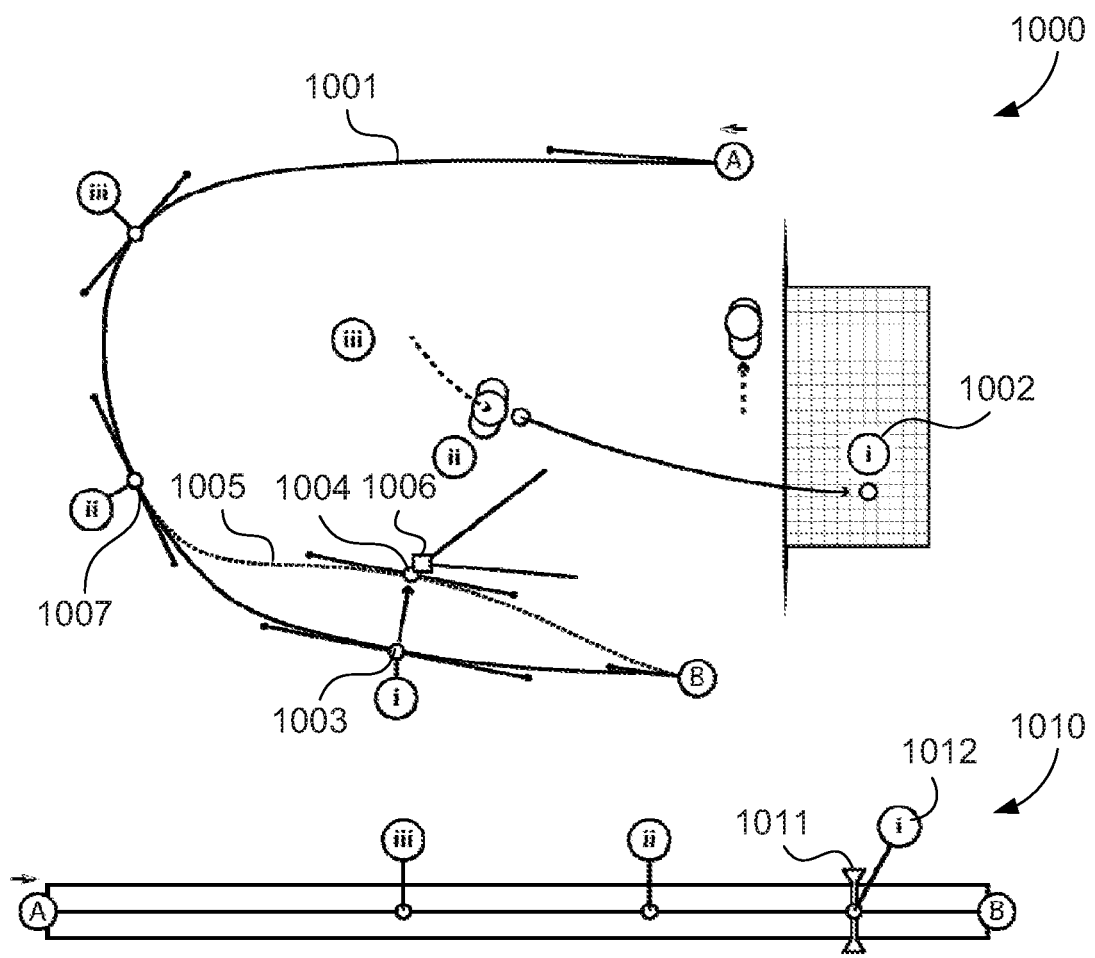
FIG. 10 shows an illustration of a virtual representation of a scene with a recreated camera path before and after a user modifies the path.

FIG. 10 demonstrates a benefit of using a camera path modified using the methods described herein. Users who want to edit a camera path are more likely to edit parts of the camera path in relation to particular events to reduce time to broadcast. Camera paths may also be edited to provide the broadcast audience a different or enhanced perspective of an event, being a perspective that was not provided originally. FIG. 10 shows an example environment 1000. In the example of FIG. 10 the intent of the user is to modify the point of view of a virtual camera 1006 along a path 1001 at the moment a goal is scored at an event 1002. The user moves a play head 1011 to a position 1012 on an editable timeline 1010. The position 1012 of the play head 1011 coincides with the goal event 1002. Using an input device, for example the touch-screen 1314, the user can modify the camera path 1001 by moving the pose of the camera 1006 from an original position 1003 to a new pose 1004. As all control points along the camera path 1001 represent saved camera poses in relation to events of importance, the newly modified path 1005 retains all the salient poses without having to create, delete or otherwise edit any other point. To assist the user, display an annotation showing the name of the identified event, for example "i" alongside the control point 1012 on the timeline 1010. Other annotations than identifying or naming an event associated with the timeline may be used. For example, an annotation identifying the action (for example, goal or kick) can be used at each control point in the timeline, or symbols can be used to identify a tier of each event (for example a colour or a particular shape for a Tier 1 event), to assist the user when editing the camera path.

Figure 14:
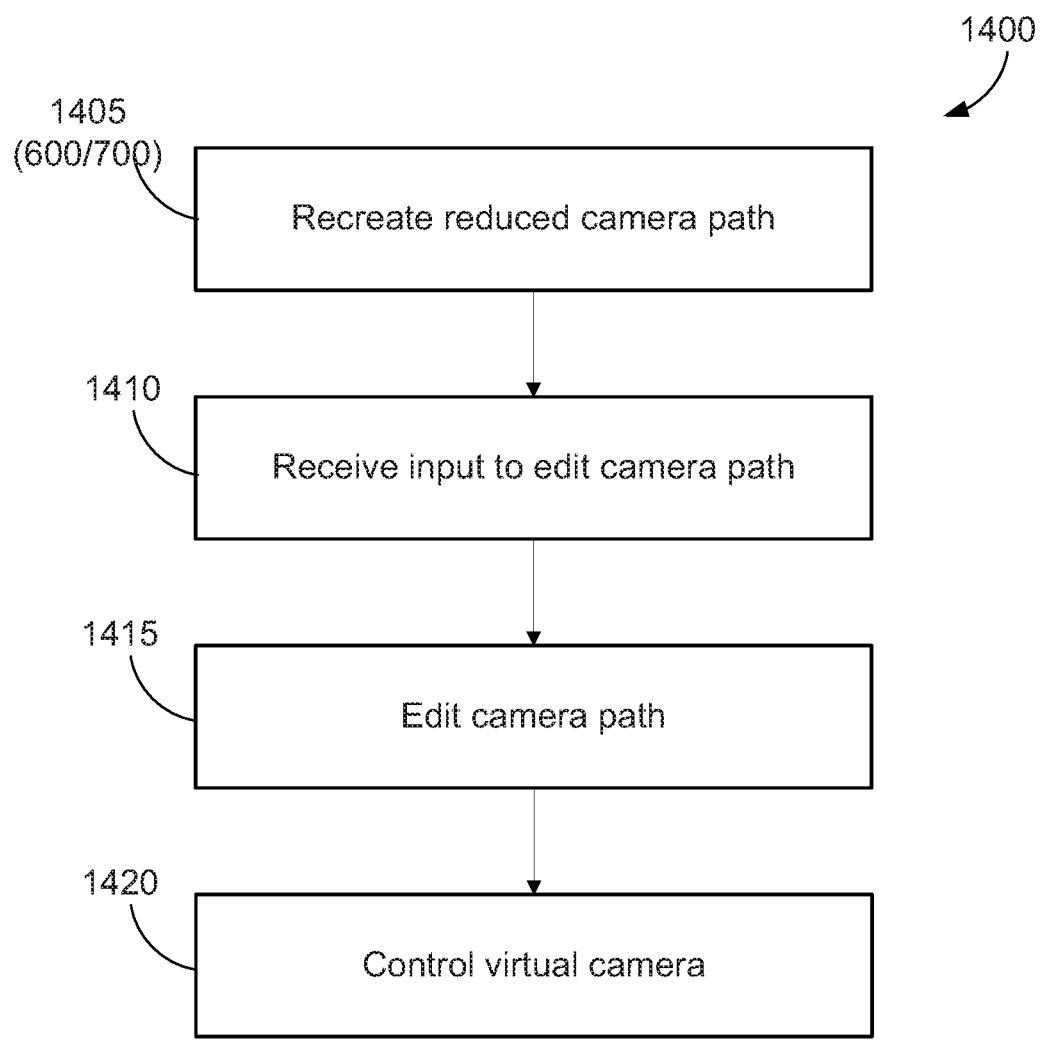
FIG. 14 shows a method of controlling a virtual camera.

FIG. 14 shows a method 1400 of controlling a virtual camera using a recreated camera path. The method 1400 is typically implemented as one or more modules of the application 1333, stored in the memory and executed under control of the processor 1305.

The method 1400 starts at a generating step 1405. The step 1405 operates to recreate a virtual camera path using the method 600 or 700, for example upon a user pressing an edit button. Operation of the step 1405 results in generation of the timeline 910 of FIG. 9. In some implementations, steps 603 and 703 can be implemented on the server 1399 rather than on the tablet device 1301.

The method 1400 progresses from step 1405 to a receiving step 1410. At step 1410 the user uses the timeline 910 to select and edit a control point. For example, as shown in FIG. 10, the user provides an instruction to move the control point 1003 to a new location 1004 to generate virtual camera footage closer to the player that kicked the goal.

The method 1400 continues under execution of the processor 1305 from step 1410 to an editing step 1415. Step 1415 operates to generate a modified camera path 1005 based on the user instruction to move the control point 1003 to the location 1004. The step 1415 typically also includes interpolating between the control points to generate a smooth modified camera path, which includes smooth transitions from the control point 1007 to the control point 1004 to the end of the virtual camera sequence. However, interpolation can be done while controlling the virtual camera at step 1420. The camera path is therefore effectively modified based on the control points in response to the user input received at step 1410 in relation to at least one of the control points.

The method 1400 continues under execution of the processor 1305 from step 1410 to a controlling step 1420. Execution of the controlling step 1420 operates to control operation of the virtual camera, for example by controlling configuration of the virtual camera in accordance with the modified path generated at step 1415 and optionally by associating speed or acceleration of virtual camera transitions between the control points, to generate video footage, for example from the point 1004 at about the time 1011 to the end of the virtual camera sequence. Step 1420 operates to generate the virtual camera video from the modified camera path, including the control point 1004, using known virtual camera generation (also known as free viewpoint generation) techniques and data received from relevant ones of the cameras 120*a* to 120X. The virtual camera video is effectively generated by rendering virtual camera viewpoints using one of free viewpoint generation techniques described above in accordance with virtual camera poses defined by the modified camera path 1005 and a timeline 1010 corresponding to the virtual camera poses. The timeline 1010 corresponds to a timeline in the scene.

The cameras 120A to 120X are time synchronised, i.e. the cameras 120A to 120X simultaneously capture a particular event from different perspectives, which enables synthesis of a viewpoint for a particular virtual camera pose and a particular moment in time in the scene. For example, the user can "freeze" time and control a virtual camera to generate a replay video of a "frozen" scene as seen from different viewpoints. In the case when the scene is frozen for at a particular time, a replay timeline 1010 can be modified to include an additional plurality of control points which signify the same time code as the scene time when the scene was frozen. The virtual camera can be controlled to traverse the plurality of additional control points at predetermined speed.

Rendering of the virtual camera viewpoints is typically implemented on the server 1399 rather than on the tablet device 1301. The tablet device 1301 may send the modified camera path 1005 accompanied by the timeline 1010 in a manner that a virtual camera pose from the modified camera path 1005 can be associated with a corresponding point in the timeline 1010. For example, interpolation between the control points of the modified camera path 1005 can determine one or more virtual camera poses for every point in the timeline 1010.

The server 1399 then renders the scene using data received from the cameras 120A to 120X for a particular point in the timeline 1005 using a corresponding virtual camera pose defined by the modified camera path 1005. Alternatively, for a relatively short timeline, the tablet device 1301 may be given a model generated by the server 1399 for the timeline 1010 to enable the tablet device 1301 to render viewpoints of the modified camera path 1005.

The rendered video footage is then displayed on a display of the device 1301 for example for preview by the user. Once the user is satisfied with the result, the rendered video can be broadcast to a wider audience. In some implementations, broadcasting can be implemented in real time while rendering the scene. Alternatively, the rendered output may be subject to further processing prior to broadcasting, e.g. can be simply uploaded to video sharing web sites, incorporated into news etc.

While the event based control points define the pose of the camera at specific times along the timeline, the event based control points alone do not typically provide enough information to derive variations in camera velocity that may have originally existed in the original path. Referring to FIG. 3, the camera pose coordinates 302 vary in density along the path. The camera pose coordinates are more tightly grouped near the middle of the path than towards the ends. The tighter grouping indicates that the speed of the camera 306 slowed down near the middle creating more camera pose coordinates. To accurately recreate the original camera path 301, ability to account for changes in velocity and recreate the changes in velocity in the path is required.

Figure 11:
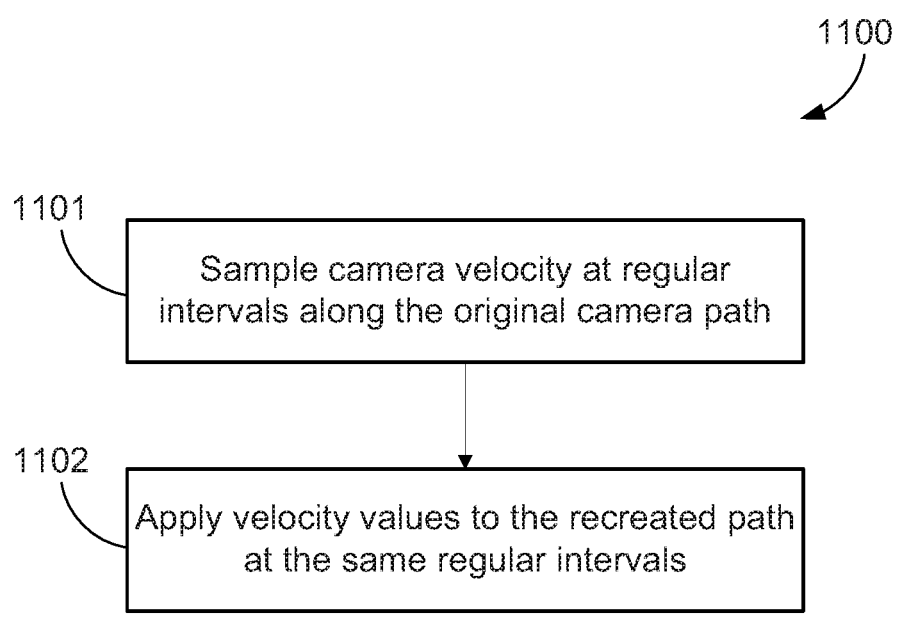
FIG. 11 shows a method of recreating original camera velocity.

A relatively simple method to achieve recreating changes in velocity would be to use camera speed and acceleration metadata associated with the original camera path 301. In absence of metadata a method to achieve recreating changes in velocity. FIG. 11 shows a method 1100. The method 1100 is typically performed at the end of step 709 of the method 700 of FIG. 7. In the context of the method 1400, the method 1100 can be executed between steps 1405 and 1410 (not shown). The method 1100 is typically implemented as one or more modules of the application 1333, stored in the memory 1309 and controlled under execution of the processor 1305.

The method 1100 starts at a sampling step 1101. The application 1333 samples the original virtual camera velocity at regular intervals at step 1101. The method 1100 continues from step 1101 to an application step 1102. Step 1102 operates to utilize or apply the velocity values generated at step 1101 along the recreated path at the same regular intervals as measurement so that the virtual camera travels along the recreated path with speed and acceleration similar to the original virtual camera path 301. Step 1105 operates to recreate the virtual camera path based on the camera speed and acceleration metadata.

Figure 12:
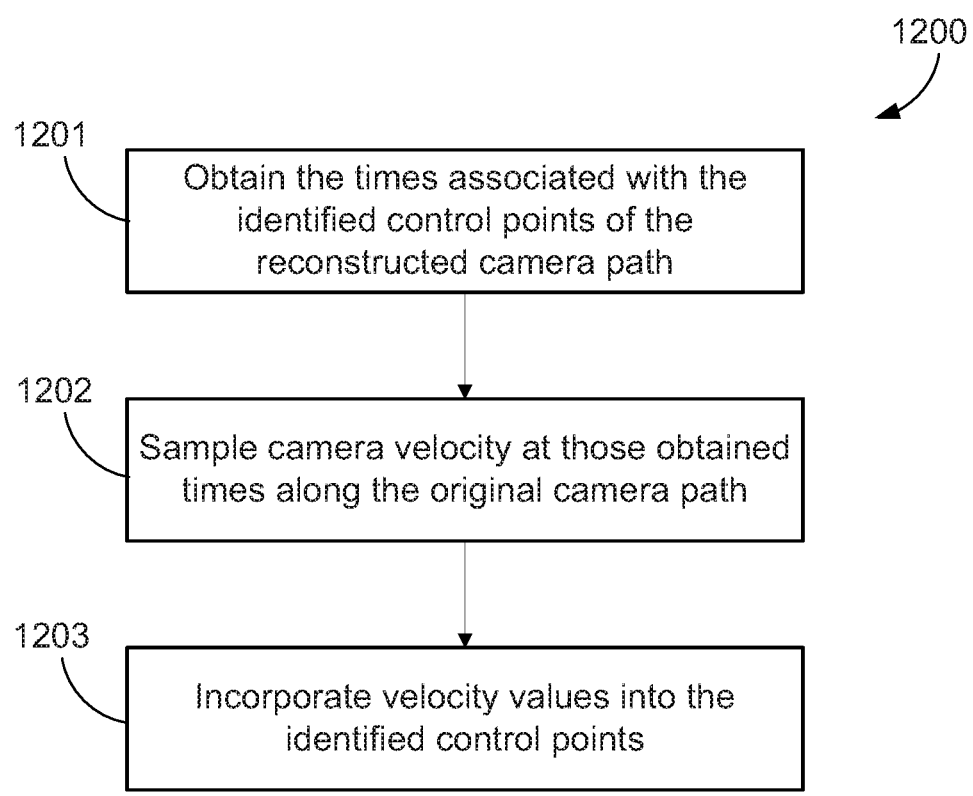
FIG. 12 shows an alternate method of recreating original camera velocity.

FIG. 12 shows an alternate method 1200 of translating camera velocity to the recreated path. Similarly to the method 1100, the method 1200 occurs after end of the method 700 of FIG. 7. In the context of the method 1400, the method 1200 can be executed between steps 1405 and 1410 (not shown). Once a sufficient number of control points have been identified and created to recreate the original path, the method 1200 starts at an obtaining step 1201. Operation of step 1201 obtains the times associated with the identified control points. The method 1200 continues under execution of the processor 1305 to a sampling step 1202. The application 1333 uses the Obtained times as reference to sample camera velocity data along the original camera path at step 1202. The method 1200 continues under execution of the processor 1305 from step 1202 to an incorporation step 1203. At step 1203 the sampled velocity values are incorporated into the control points and used to interpolate a more accurate camera path.

The arrangements described assist a user to edit an original camera path in a quick manner. Additionally, the methods described could be implemented to reduce the file size required to store the camera path. In order to reduce file size the methods can be implemented as described, only without the need of visualising the controller points within the virtual environment 900 or the editable timeline 910.

The arrangements described are applicable to the computer and data processing industries and particularly for the broadcast and video capture industries. In determining control points based upon identified event, the camera path can be reduced in a meaningful way without losing the intention or salient events of the manually controlled camera path. Accordingly, the user can edit the camera path with relative ease and speed. The ease and speed of the user are further assisted by use of a hierarchy of events in determining the control points for recreating the camera path. Further, interpolation of the control points assists in maintaining the intention of the original camera path.

The foregoing describes only some embodiments of the present invention, and modifications and/or changes can be made thereto without departing from the scope and spirit of the invention, the embodiments being illustrative and not restrictive.

The invention claimed is:

1. A method of controlling a virtual viewpoint, the method comprising:
   receiving information for specifying a viewpoint path of a virtual viewpoint corresponding to a virtual viewpoint video to be generated based on video data of a scene captured by a plurality of imaging apparatus, the viewpoint path defining movement of the virtual viewpoint over a period of time when the plurality of imaging apparatus capture the video data of the scene;
   detecting one or more events that have occurred in the scene in the period of time;
   determining a plurality of control points on the viewpoint path based on a plurality of specified time points within the period of time, each of the specified time points corresponding to at least one event of a predetermined type detected in the scene, wherein the plurality of control points at least partially define the viewpoint path;
   receiving an input for modifying at least one of the plurality of determined control points; and controlling the virtual viewpoint according to a viewpoint path defined based on the plurality of control points, at least one of which is modified according to the received input.

2. The method according to claim 1, wherein the virtual viewpoint is controlled by enabling modification of properties of the viewpoint path in response to user input in relation to at least one of the plurality of control points, wherein modification of the viewpoint path is disabled for user inputs in relation to the viewpoint path outside of a vicinity of the plurality of control points.

3. The method according to claim 1, wherein the viewpoint path is recreated by interpolating a path between the plurality of control points using position in space of the virtual viewpoint at the determined plurality of control points.

4. The method according to claim 1, wherein modification of the viewpoint path is enabled in a vicinity of each of the determined plurality of control points and disabled for other portions of the viewpoint path.

5. The method according to claim 1, wherein modification of the viewpoint path in the vicinity of one of the plurality of control points is enabled, and in response to the modification, the viewpoint path is modified based on further control points of the plurality of control points.

6. The method according to claim 1, further comprising recreating the viewpoint path using the plurality of control points such that a geometry of the recreated viewpoint path substantially matches a geometry of the received viewpoint path.

7. The method according to claim 1, wherein each of the specified time points is associated with an importance score of a corresponding predetermined event, and wherein the plurality of control points is determined based on the associated importance scores.

8. The method according to claim 1, wherein the plurality of control points is further identified based on a quality of a viewpoint path recreated by the determined plurality of control points.

9. The method according to claim 8, wherein the quality of the recreated viewpoint path is determined by comparing the received viewpoint path to the viewpoint path recreated using the determined plurality of control points.

10. The method according to claim 1, further comprising reproducing at a graphical user interface a timeline of the plurality of control points with each control point being accompanied by a type of a corresponding event, the input being received in relation to the timeline.

11. The method according to claim 1, wherein the information comprises data of speed and acceleration of the virtual viewpoint on the viewpoint path, the speed and acceleration of the view point being measured and collected at regular intervals along the viewpoint path.

12. The method according to claim 11, wherein the viewpoint path is recreated based on the speed and acceleration of the virtual viewpoint.

13. The method according to claim 1, wherein the viewpoint path is recreated by interpolating data of speed and acceleration of the virtual viewpoint between the determined plurality of control points.

14. The method according to claim 1, wherein the plurality of control points are determined based on a hierarchy of events of predetermined type detected in the video data.

15. The method according to claim 1, wherein
the receiving of the input includes receiving a user input to a graphical user interface reproducing a timeline of the control points, the user input being in relation to at least one of the plurality of control points.

16. The method according to claim 15, wherein the timeline includes at least one annotation identifying an event associated with each of the plurality control points.

17. A non-transitory computer readable storage medium storing program instructions for controlling a virtual viewpoint, the program comprising:
code for receiving information for specifying a viewpoint path of a virtual viewpoint corresponding to a virtual viewpoint video to be generated based on video data of a scene captured by a plurality of imaging apparatuses, the view point path defining movement of the virtual viewpoint over a period of time when the plurality of imaging apparatuses capture the video data of the scene;
code for detecting one or more events that have occurred in the scene in the period of time;
code for determining a plurality of control points on the viewpoint path based on a plurality of specified time points within the period of time, each of the specified time points corresponding to at least one event of a predetermined type detected in the scene, wherein the plurality of control points at least partially define the viewpoint path;
code for receiving an input for modifying at least one of the plurality of determined control points; and
code for controlling the virtual viewpoint according to a viewpoint path defined based on the plurality of control points, at least one of which is modified according to the received input.

18. An apparatus, comprising:
one or more processors; and
one or more memories storing instructions for directing the one or more processors to perform a method of controlling a virtual viewpoint, the method comprising:
receiving information for specifying a viewpoint path of a virtual viewpoint corresponding to a virtual viewpoint video to be generated based on video data of a scene captured by a plurality of imaging apparatuses, the viewpoint path defining movement of the virtual viewpoint over a period of time when the plurality of imaging apparatuses capture the video data of the scene;
detecting one or more events that have occurred in the scene in the period of time;
determining a plurality of control points on the viewpoint path based on a plurality of specified time points within the period of time, each of the specified time points corresponding to at least one event of a predetermined type detected in the scene, wherein the plurality of control points at least partially define the viewpoint path;
receiving an input for modifying at least one of the plurality of determined control points; and
controlling the virtual viewpoint according to a viewpoint path defined based on the plurality of control points, at least one of which is modified
according to the received input.

19. A system comprising:
one or more processors; and
one or more memories storing instructions for directing the one or more processors to perform a method of controlling a virtual viewpoint, the method comprising:
receiving information for specifying a viewpoint path of a virtual viewpoint corresponding to a virtual viewpoint video to be generated based on video data of a scene captured by a plurality of imaging apparatuses, the viewpoint path defining movement of the virtual viewpoint over a period of time when the plurality of imaging apparatuses capture the video data of the scene;

detecting one or more events that have occurred in the scene in the period of time;

determining a plurality of control points on the viewpoint path based on a plurality of specified time points within the period of time, each of the specified time points corresponding to at least one event of a predetermined type detected in the scene, wherein the plurality of control points at least partially define the viewpoint path;

receiving an input for modifying at least one of the plurality of determined control points; and controlling the virtual viewpoint according to a viewpoint path defined based on the plurality of control points, at least one of which is modified according to the received input.

* * * * *